(12) United States Patent
Ohashi et al.

(10) Patent No.: US 10,406,999 B2
(45) Date of Patent: Sep. 10, 2019

(54) BRACKET ASSEMBLING MECHANISM

(71) Applicant: DAIWA KASEI INDUSTRY CO., LTD., Aichi (JP)

(72) Inventors: Kenji Ohashi, Aichi (JP); Naohiro Sawada, Aichi (JP); Atsushi Tokunaga, Aichi (JP)

(73) Assignee: DAIWA KASEI INDUSTRY CO., LTD., Aichi (JP)

( * ) Notice: Subject to any disclaimer, the term of this patent is extended or adjusted under 35 U.S.C. 154(b) by 230 days.

(21) Appl. No.: 15/678,428

(22) Filed: Aug. 16, 2017

(65) Prior Publication Data
US 2018/0072248 A1    Mar. 15, 2018

(30) Foreign Application Priority Data

Sep. 15, 2016    (JP) .................................. 2016-180286

(51) Int. Cl.
| | |
|---|---|
| *F16L 3/10* | (2006.01) |
| *B60R 16/02* | (2006.01) |
| *H02G 3/32* | (2006.01) |
| *H02G 3/04* | (2006.01) |

(52) U.S. Cl.
CPC ........ *B60R 16/0215* (2013.01); *F16L 3/1075* (2013.01); *H02G 3/32* (2013.01); *F16L 3/1025* (2013.01); *H02G 3/0468* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,390,876 A | * | 2/1995 | Hatano | F16L 3/1075 248/68.1 |
| 5,494,245 A | * | 2/1996 | Suzuki | F16L 3/1075 24/487 |
| 5,730,402 A | * | 3/1998 | Sallen | F16L 3/127 248/74.1 |
| 6,682,026 B2 | * | 1/2004 | Nagayasu | F16L 3/12 248/73 |
| 7,661,631 B2 | * | 2/2010 | Ibaraki | F16L 3/1025 248/68.1 |

(Continued)

FOREIGN PATENT DOCUMENTS

JP     2007143309 A    6/2007

*Primary Examiner* — Monica E Millner
(74) *Attorney, Agent, or Firm* — McClure, Qualey & Rodack, LLP

(57) ABSTRACT

To provide a bracket assembling mechanism that assembles a bracket to a vehicle component while preventing the bracket from shaking.
A bracket assembling mechanism assembles a bracket 101 to an assembling part 10 of a vehicle holding component 1. The assembling part 10 includes an accommodating part 11 that accommodates the bracket 101 and a retainer engaging part 12 that retains the accommodated bracket 101. The accommodating part 11 includes an elastic projecting part 9 that projects from a side wall surface that opposes the accommodated bracket 101 in a widthwise direction $101z$ of the bracket. When the bracket 101 is accommodated, the elastic projecting part 9 is elastically deformed in a manner that its distal end side is bent in a plate thickness direction $101y$ of the bracket 101.

13 Claims, 20 Drawing Sheets

(56) References Cited

U.S. PATENT DOCUMENTS

| | | | | |
|---|---|---|---|---|
| 7,938,371 B2* | 5/2011 | Oga | F16L 3/1025 248/55 |
| 8,013,248 B2* | 9/2011 | Sakata | H02G 3/0691 174/40 CC |
| 8,979,039 B2* | 3/2015 | Shiga | B60R 16/0215 174/40 CC |
| 2014/0151514 A1* | 6/2014 | Asai | B60R 16/0215 248/74.1 |
| 2016/0114743 A1* | 4/2016 | Miyamoto | F16L 3/1075 224/557 |
| 2017/0146154 A1* | 5/2017 | Tally | F16L 3/1075 |

* cited by examiner

BRACKET ASSEMBLING MECHANISM

RELATED APPLICATIONS

This application claims the priority of Japanese Patent Application No. 2016-180286 filed on Sep. 15, 2016. The disclosure of the prior application is hereby incorporated herein in the entirety by reference.

BACKGROUND OF THE INVENTION

Field of the Invention

This invention relates to an assembling mechanism that assembles a bracket for attaching to a vehicle body to a vehicle component.

Description of the Related Art

In attaching vehicle components such as clamps to vehicle bodies, such vehicle components have already had a plurality of wires such as wire harnesses to be laid out in vehicles. One of such vehicle components is a vehicle component that is attached to a vehicle body not directly but via a bracket for attaching to a vehicle body. This vehicle component includes an assembling part to which the bracket is assembled (for example, Patent Document 1).

One of such assembling parts includes an accommodating part and an elastic engaging piece. The accommodating part accommodates a bracket from its lower opening toward an upper direction. The elastic engaging piece elastically deforms as the bracket moves within the accommodating part toward the upper direction so as to allow for moving of the bracket, and then elastically returns its original shape when the bracket moves to a predetermined accommodation position so as to be engaged with an engaging part of the bracket. The engagement of the elastic engaging piece with the engaging part of the bracket enables a vehicle component to be retained by the bracket.

PATENT DOCUMENT

[Patent Document 1] Japanese Laid-Open Patent Publication No. 2007-143309

An assembling part is typically designed to leave a small space between an inner wall surface of an accommodating part and a bracket so that the bracket moves easily into the accommodating part. The assembling operation of the bracket thus becomes easy. However, this space causes the bracket to shake within the accommodating part.

An object of this invention is to provide a bracket assembling mechanism that assembles a bracket to a vehicle component while preventing the bracket from shaking.

SUMMARY OF THE INVENTION

In order to solve the above problem, a bracket assembling mechanism according to this invention assembles a bracket attached to a vehicle body to an assembling part of a vehicle component. The assembling part includes an accommodating part that accommodates the bracket from a lower opening toward an upper direction and a retainer engaging part that is engaged with a retainer part of the bracket so as to prevent removal of the bracket in an accommodated state. The accommodating part includes a plurality of central wall surfaces that oppose to each other to sandwich the bracket in an accommodated state in a plate thickness direction, a side wall surface that opposes the bracket in an accommodated state in a widthwise direction of the bracket, and an elastic projecting part that projects from the side wall surface and that is pressed, at its distal end side, against an end part of the bracket in the widthwise direction when the bracket is accommodated in the accommodating part so as to be bent and elastically deformed in the plate thickness direction.

According to the configuration described above, the plate-like bracket that is accommodated in the accommodating part and assembled thereto is pressed by the elastic projecting part in the widthwise direction of the bracket, and thus shaking of the bracket is prevented. The elastic projecting part continuously presses the bracket while being bent in the plate thickness direction and elastically deformed, unlike a rib that plastically deforms and crushes. Shaking of the bracket is thus prevented constantly. If the bracket crushes the distal end of the projecting part and then is accommodated in the accommodating part, the crushed projecting part cannot push the bracket sufficiently and thus it is impossible to constantly prevent the bracket from shaking unlike the configuration described above.

The elastic projecting part according to this invention may be an elastic rib that extends in a bracket movement direction. According to such a configuration, it is possible to reliably prevent the bracket from shaking by the elastic projecting part that is a projection formed to be long in the bracket movement direction.

The elastic projecting part according to this invention may include a deformation inducing surface on an abutment surface that abuts first against the bracket that is to be accommodated in the accommodating part. The deformation inducing surface is shaped so as to, when abutting against and then being pressed against the bracket moving in the movement direction, induce elastic deformation toward a predetermined side in the plate thickness direction of the bracket. Consequently, the elastic projecting part is bent surely and easily in a predetermined direction when the bracket is moved into the accommodating part.

The accommodating part according to this invention may include a central accommodating part that accommodates a central part of the bracket in an accommodated state in the widthwise direction by sandwiching the bracket between the central wall surfaces and a bent-end accommodating part that accommodates a bent end part of the bracket in an accommodated state in the widthwise direction. The accommodating part can thus accommodate a bracket with a bent end part. The bent-end accommodating part is formed to extend from both end sides of the bracket in an accommodated state in the widthwise direction toward a first side in the plate thickness direction of the bracket and a second side opposite to the first side. Consequently, the accommodating part can accommodate a first bracket and a second bracket with a bent end part bent in the opposite direction to a bent end part of the first bracket. Specifically, the accommodating part can accommodate a U-shaped bracket having bent end parts bent on both end sides in the widthwise direction in the same direction, an S-shaped bracket having bent end parts bent on both end sides in the widthwise direction in opposite directions, and an L-shaped bracket with only one end part in the widthwise direction being bent. It is needless to mention that the accommodating part can accommodate a bracket without any bent end part.

The elastic projecting part according to this invention is connected to only the side wall surface, and is not connected to other wall surfaces in the projecting direction and the direction perpendicular to the projection direction. Specifically, the elastic projecting part does not contact other wall surfaces in the projecting direction and on the inner and outer sides in the bracket movement direction. According to such a configuration, the elastic projecting part functions as a free end extending from the side wall surface on its entire portion in the longitudinal direction. Consequently, it is possible to cause the elastic projecting part to be surely bent and pressed against the bracket, thus reliably preventing shaking of the bracket.

The accommodating part according to this invention includes a bottom wall part on the inner side in the bracket movement direction. In such a case, the bottom wall part includes an opening near an end part of the elastic projecting part on the inner side in the bracket movement direction. This opening enables the bottom wall part to achieve non-connection and non-contact with the elastic projecting part. When the accommodating part includes the bottom wall part, it is assumed that the end part of the elastic projecting part is connected to the bottom wall part. In such a case, the elastic projecting part is hardly bent on its side connected to the bottom wall part. According to the configuration described above, an opening is formed near the elastic projecting part in the bottom wall part to eliminate connection of the end part of the elastic projecting part and the bottom wall surface, so that the elastic projecting part is surely bent. Additionally, the opening is a lightening hole, which also contributes saving of a resin material.

DESCRIPTION OF THE EMBODIMENTS

A first embodiment of this invention is described below with reference to the drawings.

Figure 1:
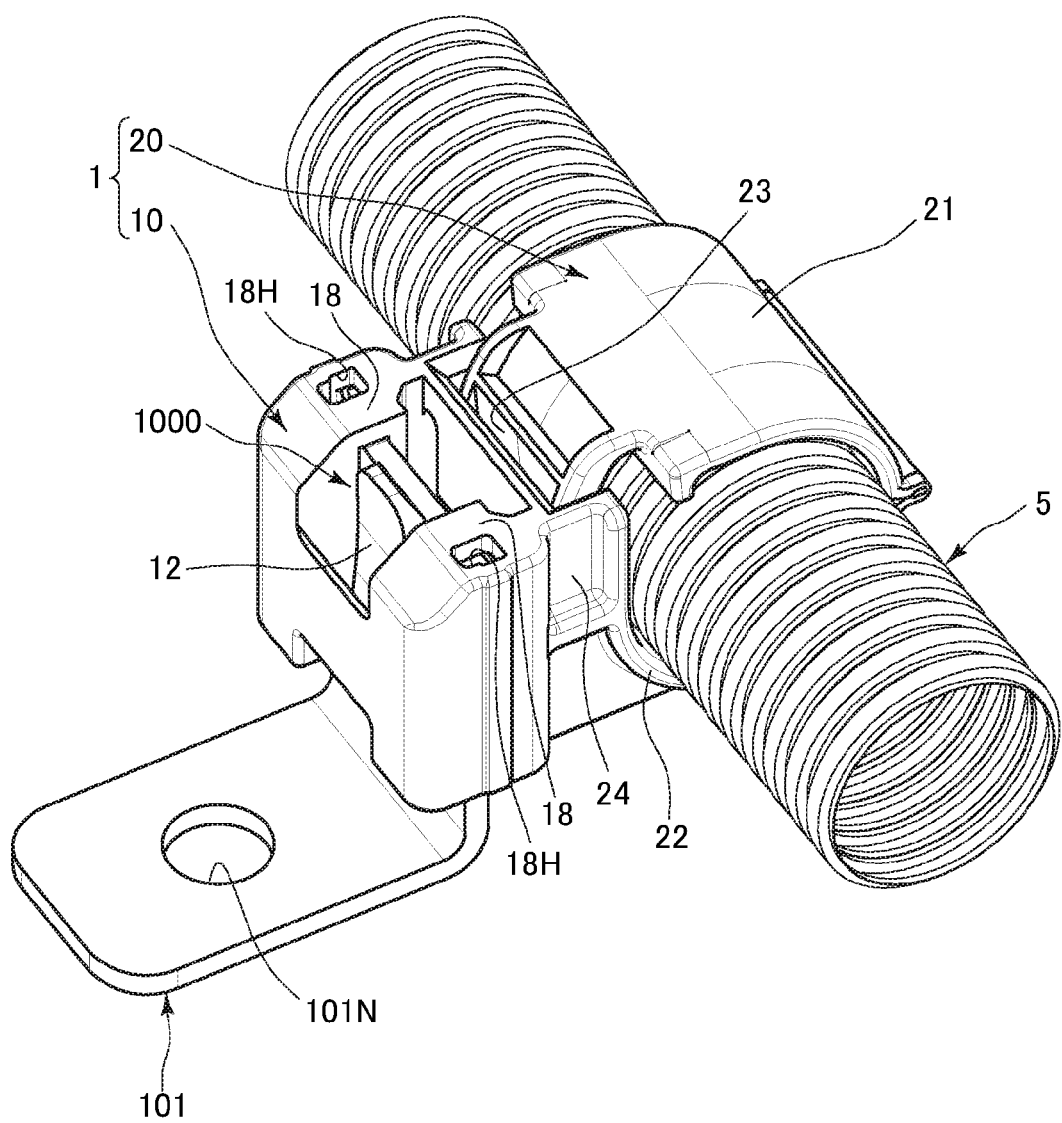
FIG. 1 is a perspective view of a state where a vehicle component including a bracket assembling mechanism according to a first embodiment of this invention holds a predetermined member.
Figure 2:
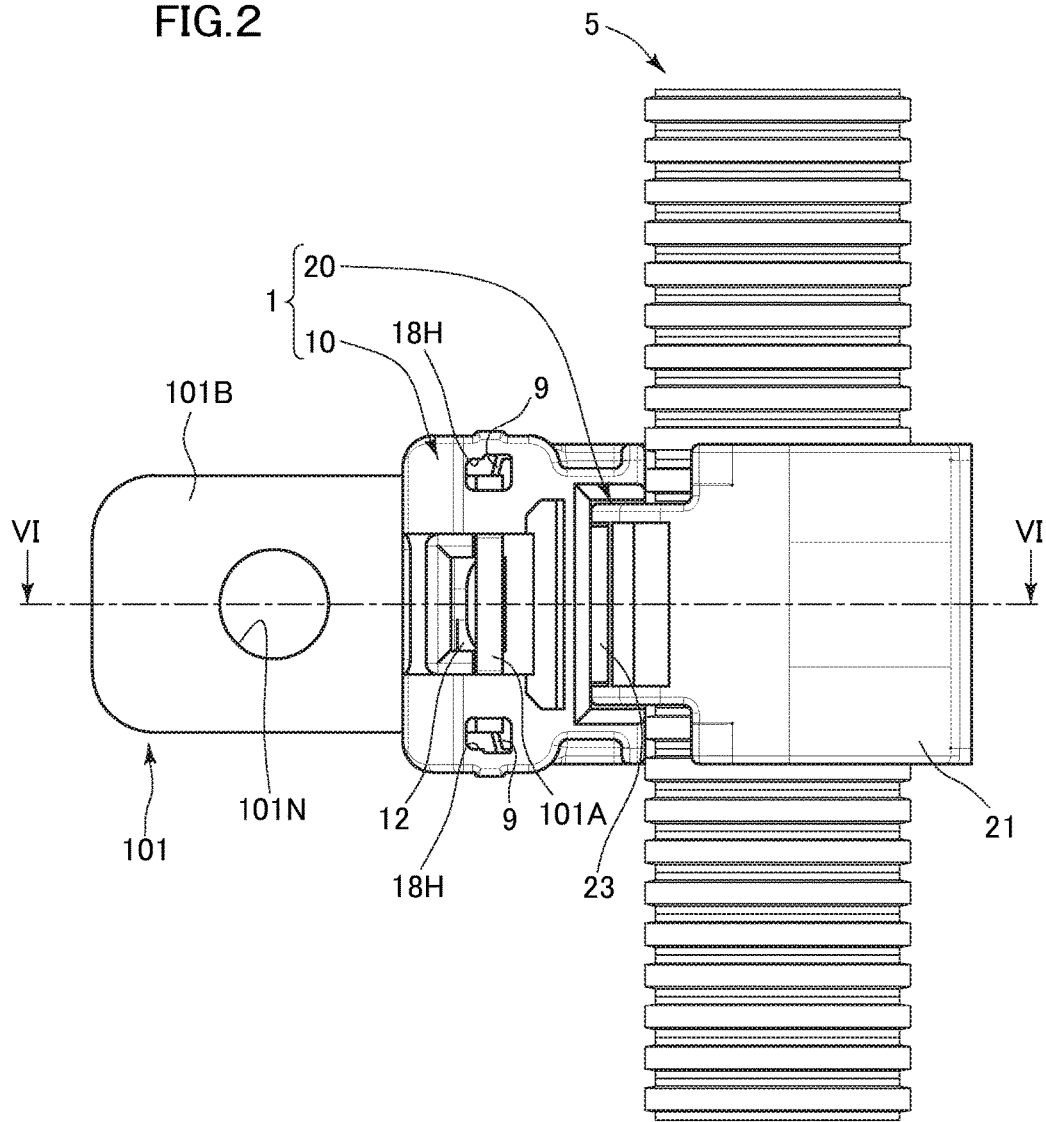
FIG. 2 is a plan view of FIG. 1.

FIG. 1 is a perspective view of a state where a bracket (that is, an attachment tool) 101 attached to a vehicle body 100 (see FIG. 3) is assembled to an assembling part 10 of a vehicle holding component 1 (see FIG. 1), that is, a vehicle component. The vehicle holding component 1 includes a bracket assembling mechanism 1000 according to this invention. The vehicle holding component 1 integrally includes the assembling part 10 to which the bracket 101 is assembled and a holding part 20 functioning as a functional part that performs a predetermined function, as shown in FIGS. 1 to 4. The holding part 20 functions to removably hold a predetermined member 5.

The predetermined member 5 may be an elongated member that extends long in a predetermined direction. Specifically, the predetermined member 5 is a corrugated tube, and a plurality of wires, that is, wire harnesses (not shown) are accommodated in the corrugated tube. The predetermined member 5 may be a wire harness itself or may be other members that are held by the holding part 20.

Figure 3:
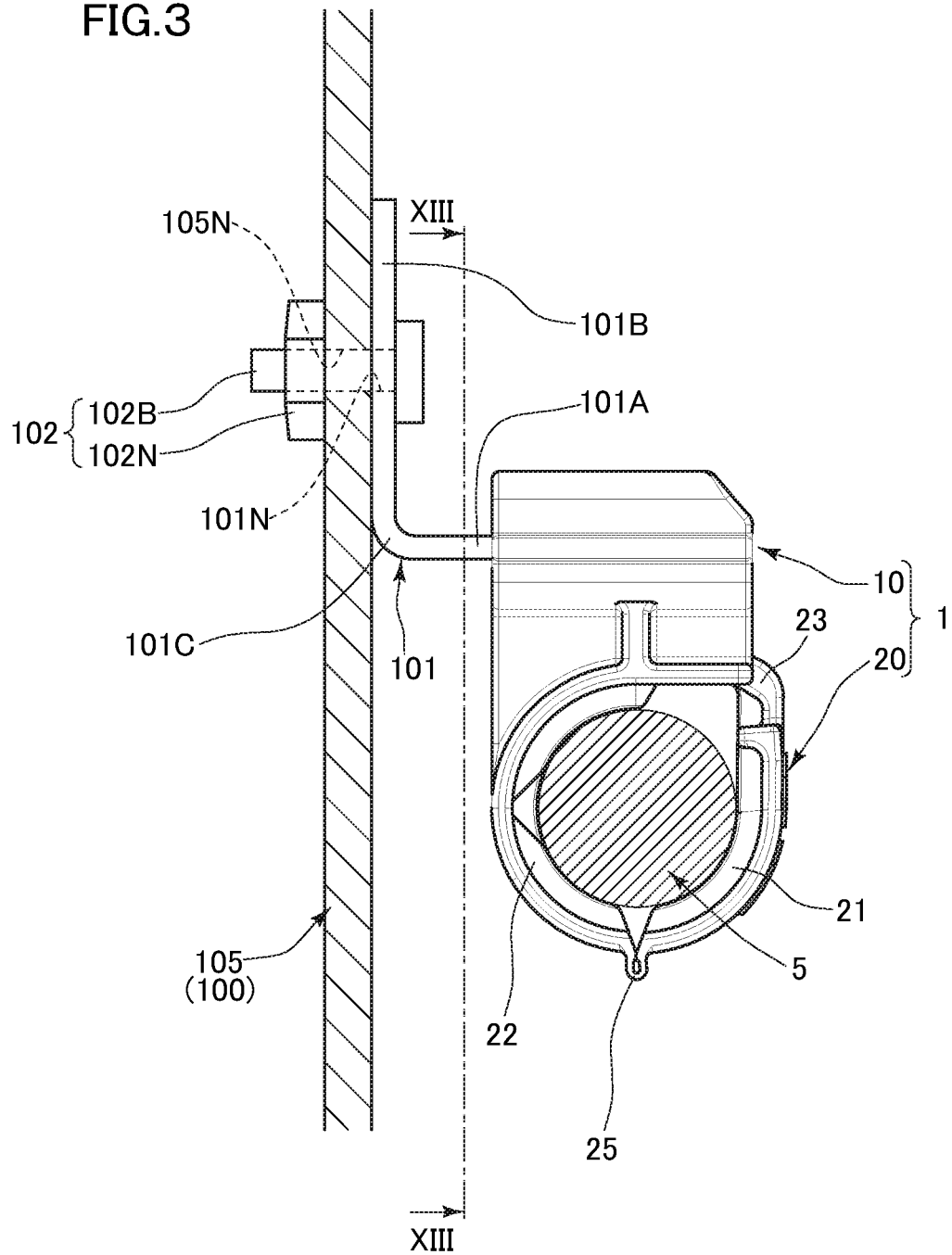
FIG. 3 is a front view of the vehicle component shown in FIG. 1 having been attached to a vehicle body.
Figure 4:
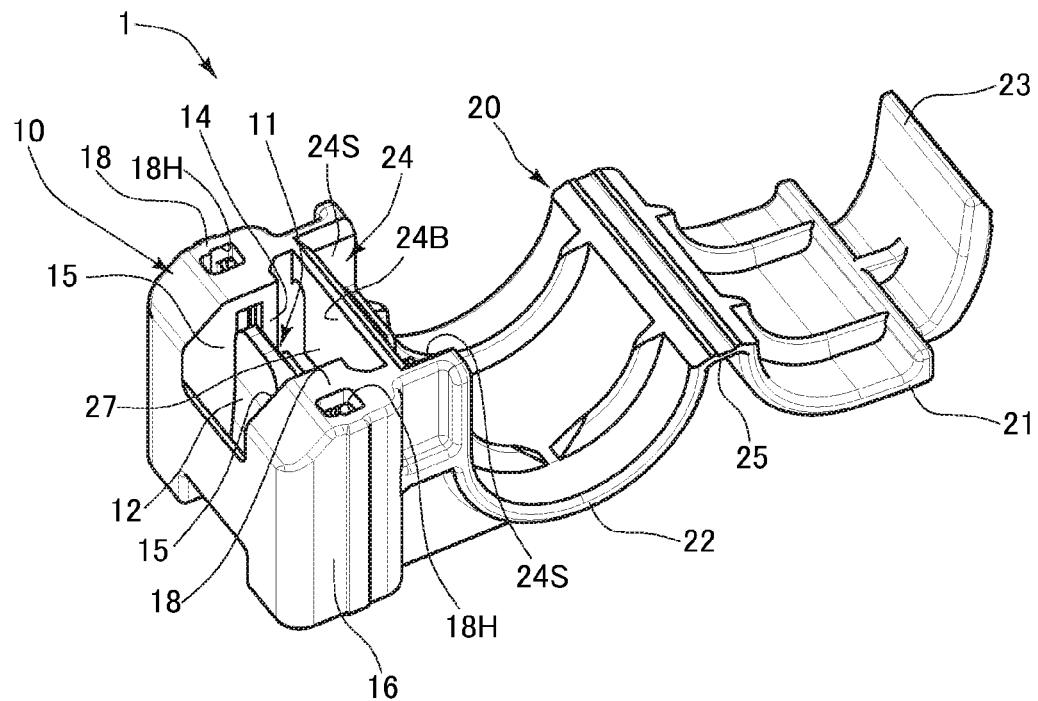
FIG. 4 is a perspective view of the vehicle component shown in FIG. 1 in which a holding part does not hold the predetermined member.

The holding part 20 of the vehicle holding component 1 includes, as shown in FIG. 3, an upper holding part 21 on the upper side of the predetermined member 5 functioning as a holding target, a lower holding part 22 on the lower side of the predetermined member 5, and a hinge part 25 that connects the upper holding part 21 to the lower holding part 22. As shown in FIG. 4, the holding part 20 also includes an engaging part 23 disposed on the opposite side of the upper holding part 21 to the hinge part 25 and an accommodating part 24 that is disposed on the opposite side of the lower holding part 22 to the hinge part 25 and that accommodates the engaging part 23 from its upper side toward a lower direction so as to be engaged with the engaging part 23. The upper holding part 21 is thus removably engaged with the lower holding part 22 on the opposite side to the hinge part 25 (see FIG. 8). When the upper holding part 21 is engaged with the lower holding part 22, the upper holding part 21 and the lower holding part 22 are disposed to annularly surround the outer periphery of the predetermined member 5 and vertically hold the predetermined member 5 disposed inside of the upper holding part 21 and the lower holding part 22, as shown in FIG. 3.

The upper holding part 21 may be separated from the lower holding part 22. For example, the upper holding part 21 may be vertically engaged with the lower holding part 22 and fixed thereto without using the hinge part 25, and the predetermined member 5 may be accommodated inside of the upper holding part 21 and the lower holding part 22 to be held therein. In such a case, the engaging part 23 used for the engagement of the upper holding part 21 with the lower holding part 22 needs to be provided not only on the side of the assembling part 10 but also on the side of the hinge part 25.

Figure 6:
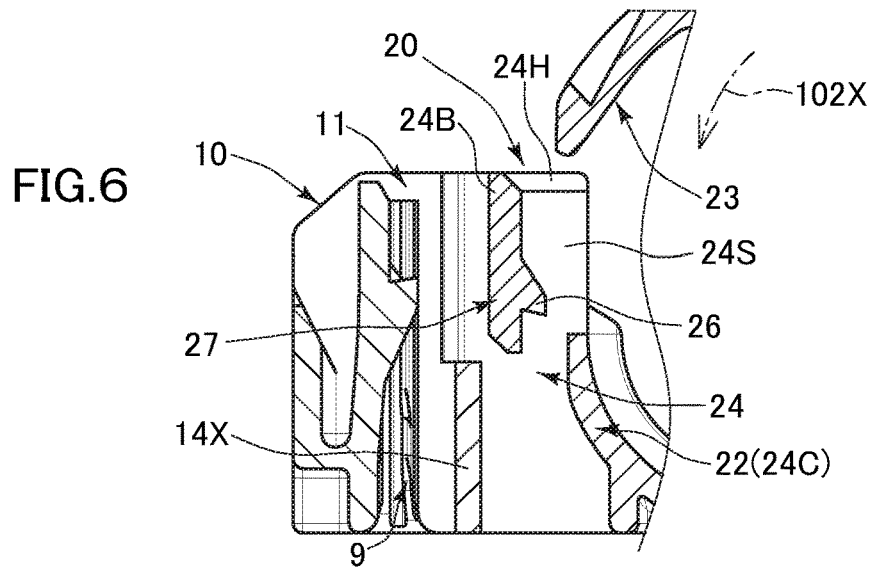
FIG. 6 shows a cross-section taken along a line VI-VI of FIG. 2 in an engagement process of the holding part of the vehicle component shown in FIG. 1.

As shown in FIGS. 4 and 6, the accommodating part 24 includes left and right side walls 24S and 24S, an upper connecting wall 24B that connects the side walls 24S and 24S on its upper side and on the side of the assembling part 10, and a lower connecting wall 24C (see FIG. 6) that connects the side walls 24S and 24S on its lower side and on the opposite side to the assembling part 10. The lower connecting wall 24C includes a wall of the arc-shaped lower holding part 22 on the side of the accommodating part 24.

A retainer engaging part 27 is a plate wall that is formed as apart of a wall that constitutes the accommodating part 24 and extends vertically. Specifically, the retainer engaging part 27 is an elastic wall that is formed to extend downward from the upper connecting wall 24B so as not to contact or so as not to be connected to the side walls 24S and 24S. The opposite side of the retainer engaging part 27 with respect to the side of the upper connecting wall 24B (a lower side of the retainer engaging part 27) can elastically deform toward the assembling part 10. Additionally, the retainer engaging part 27 includes, on its lower side, an engaging claw 26 that projects toward the accommodating part 24.

Figure 7:
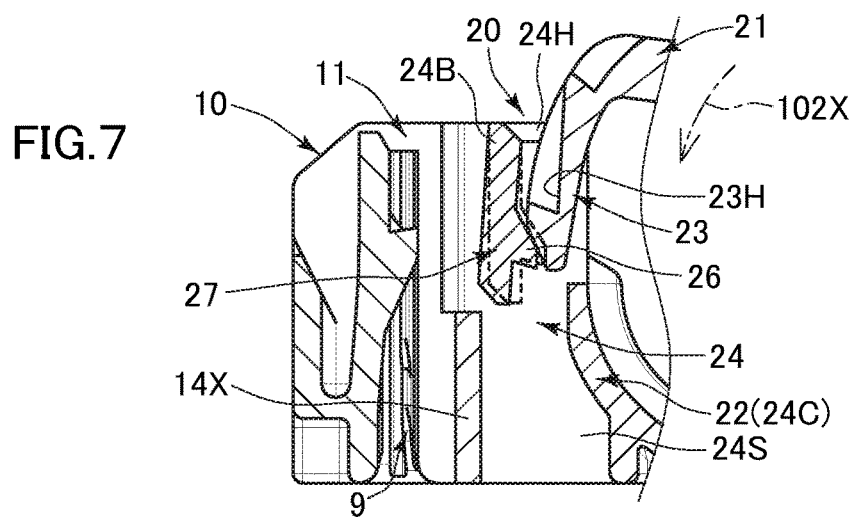
FIG. 7 is a view subsequent to FIG. 6.
Figure 8:
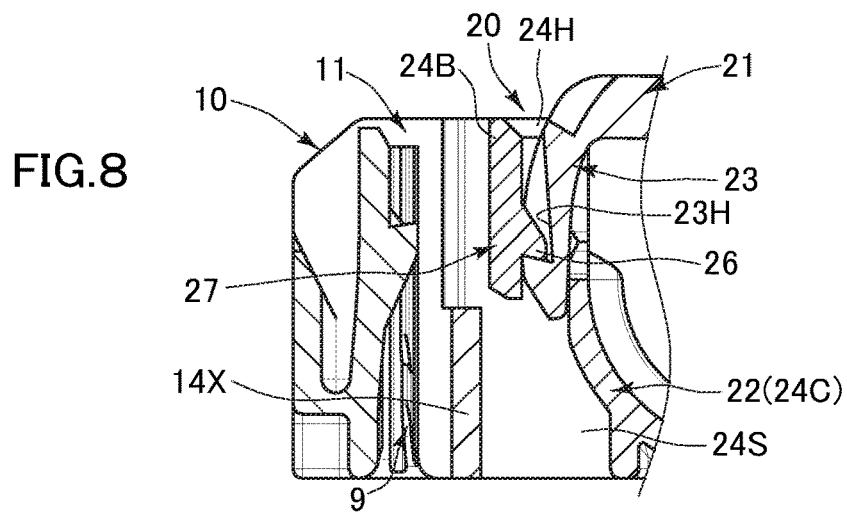
FIG. 8 is a view subsequent to FIG. 7.

As shown in FIGS. 6 to 8, the engaging part 23 enters the accommodating part 24 from an upper opening 24H of the accommodating part 24 to be engaged with the retainer engaging part 27, so that the upper holding part 21 and the lower holding part 22 are retained and engaged with each other. The upper opening 24H is surrounded by upper end portions of the side walls 24S and 24S, the upper connecting wall 24B, and the lower connecting wall 24C, and receives the engaging part 23 entering from an obliquely upward direction. As shown in FIG. 6, the engaging part 23 is moved from the upper opening 24H into the accommodating part 24 so as to draw a circular trajectory around the hinge part 25. A reference numeral 102X of FIG. 6 indicates a movement direction of the engaging part 23. The engaging part 23 moving in the direction 102X finally abuts against the engaging claw 26 that projects into the accommodating part 24 and thus the movement of the engaging part 23 is hindered. However, the engaging part 23 is pressed further downward and thus the engaging part 23 pushes and bends a lower end side of the retainer engaging part 27 having the engaging claw 26 toward the assembling part 10 (see FIG. 7). The elastic deformation of the retainer engaging part 27 thus enables the engaging part 23 to be further moved. When the engaging part 23 is moved to a predetermined engaging position, the engaging part 23 receives the engaging claw 26 within its engaging recess 23H, thus enabling the retainer engaging part 27 to elastically return to its original shape. The engaging recess 23H of the engaging part 23 is engaged with the engaging claw 26 of the retainer engaging part 27 within the accommodating part 24 as shown in FIG. 8, so that the engaging part 23 is retained and engaged, that is, upward removal of the engaging part 23 is prevented.

Figure 5:
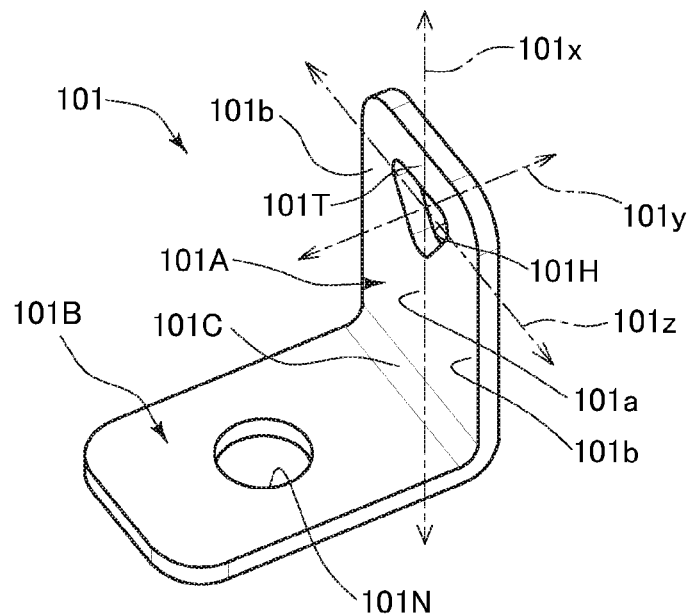
FIG. 5 is a perspective view of a bracket shown in FIG. 1.

As shown in FIG. 5, the bracket 101 is an L-shaped plate member that is bent at a right angle. The bracket 101 includes a first-side extending part 101A that extends from a bent part 101C toward a first side and a second-side extending part 101B that extends from the bent part 101C toward a second side that is different from the first side. An engaging hole 101H that is engaged with an engaging claw 13 to be described later is formed in the first-side extending part 101A. While the engaging hole 101H is a through-hole that has a triangular shape and passes through the bracket 101 in a plate thickness direction $101y$, the engaging hole 101H may have any shape that is engaged with the engaging claw 13 to be described later. For example, the engaging hole 101H may be an engaging recess that is recessed in the plate thickness direction. On the other hand, a through-hole 101N is formed in the second-side extending part 101B, as shown in FIG. 3. A bolt 102B that is screwed into a nut 102N of a fastening member 102 that is fastened and fixed to the vehicle body 100 is inserted into the through-hole 101N.

Specifically, the bolt 102B passes from the side of the bracket 101 through the through-hole 101N in the bracket 101 and a through-hole 105N in a panel 105 of the vehicle body 100 to be screwed and fastened into the nut 102N on the side of the vehicle body 100 (on the side of the panel 105), as shown in FIG. 3. This is only an example, and the bracket 101 may be fixed to the vehicle body 100 by any other methods. The bracket 101 on its side fixed to the vehicle body 100 may have other shapes.

In the bracket 101, the plate thickness direction of the first-side extending part 101A is different from the plate thickness direction of the second-side extending part 101B. That is, as shown in FIG. 5, the plate thickness direction of the first-side extending part 101A corresponds to a direction indicated by the reference numeral $101y$, whereas the plate thickness direction of the second-side extending part 101B corresponds to a direction indicated by a reference numeral $101x$. The widthwise direction corresponds to a direction indicated by a reference numeral $101z$ that is perpendicular to the plate thickness directions $101y$ and $101x$.

In the following descriptions, the plate thickness direction and the widthwise direction of the bracket 101 are respectively the plate thickness direction 101y and the widthwise direction 101z of the first-side extending part 101A accommodated in an accommodating part 11, unless mentioned otherwise.

The bracket 101 does not need to have a bent shape as in the this embodiment.

Figure 9:
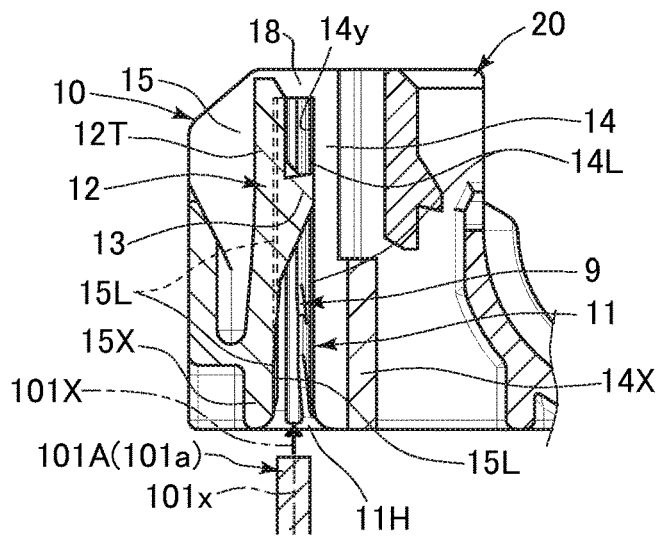
FIG. 9 shows the cross-section taken along the line VI-VI of FIG. 2 in a process of assembling the bracket to the vehicle component shown in FIG. 1.
Figure 10:
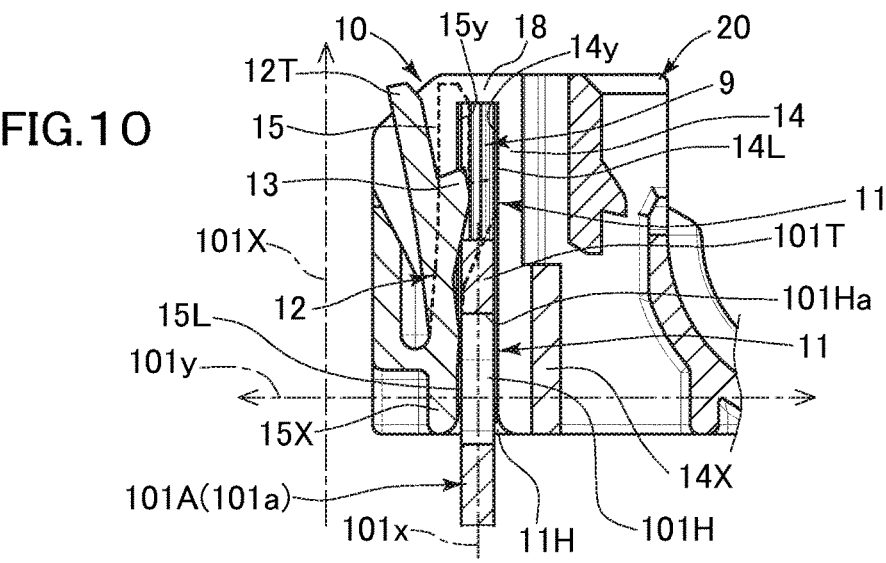
FIG. 10 is a view subsequent to FIG. 9.
Figure 11:
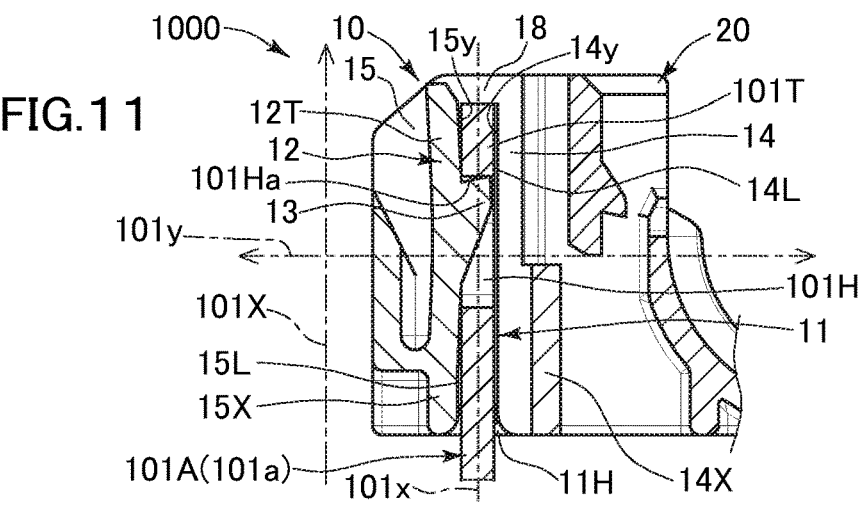
FIG. 11 is a view subsequent to FIG. 10.
Figure 12:
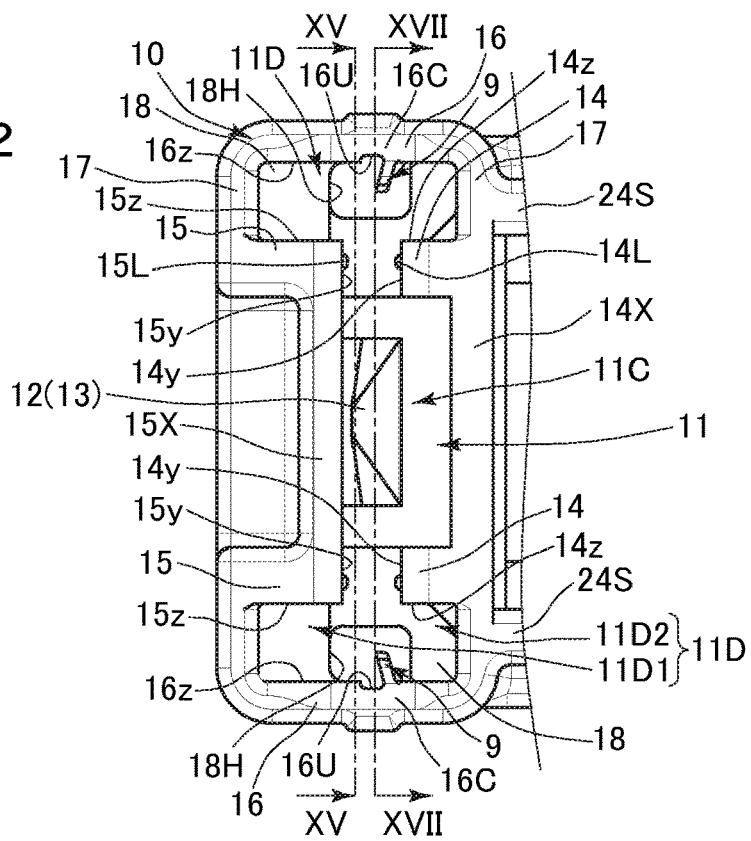
FIG. 12 is a bottom view of the vehicle component shown in FIG. 1 to which the bracket is not assembled.
Figure 13:
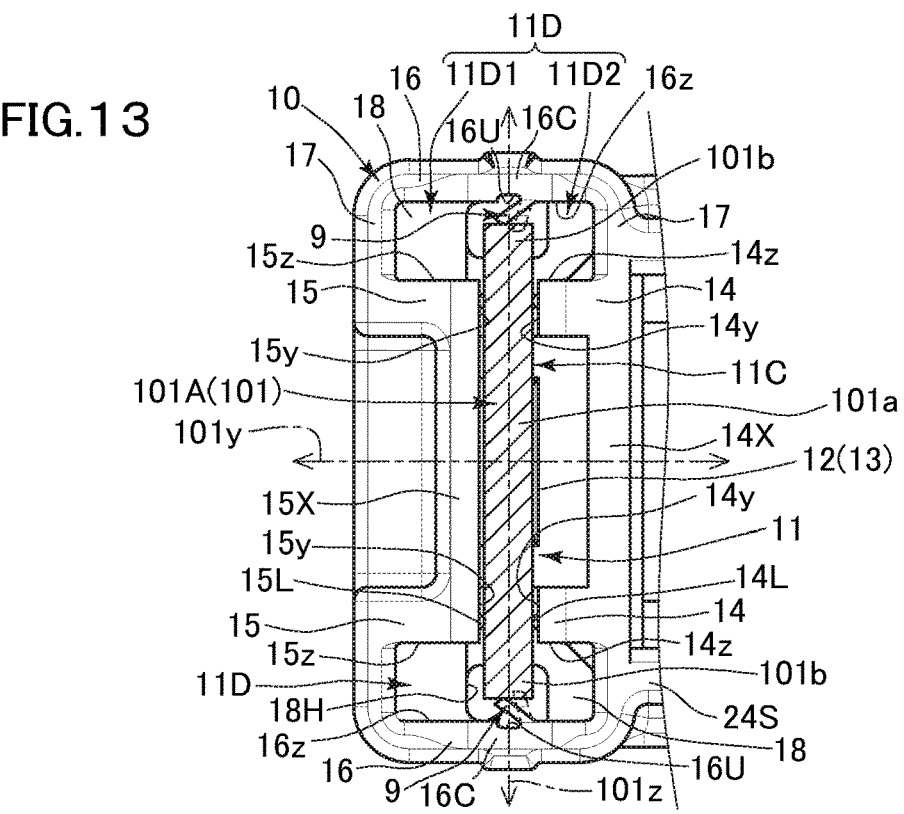
FIG. 13 shows a cross-section, taken along a line XIII-XIII of FIG. 3, of the bottom surface of the vehicle component shown in FIG. 1 having the bracket assembled thereto.

As shown in FIGS. 9 to 11, the assembling part 10 of the vehicle holding component 1 includes the accommodating part 11 that accommodates the bracket 101 from a lower opening 11H toward an upper direction and a retainer engaging part 12 that is engaged with the engaging hole 101H of the bracket 101 so as to retain the accommodated bracket 101. As shown in FIGS. 12 and 13, the accommodating part 11 includes a central accommodating part 11C that accommodates a central part 101a (see FIG. 5) of the accommodated first-side extending part 101A in the widthwise direction 101z and an end accommodating part 11D that accommodates an end part 101b in the widthwise direction 101z.

As shown in FIGS. 12 and 13, the central accommodating part 11C includes central wall surfaces 14y and 15y that sandwich the first-side extending part 101A of the bracket 101 in the plate thickness direction 101y. As the central part 101a (see FIG. 5) of the first-side extending part 101A of the bracket 101 is sandwiched between the central wall surfaces 14y and 15y, the central part 101a is accommodated in the central accommodating part 11C. Specifically, as the central part 101a (see FIG. 5) of the first-side extending part 101A of the bracket 101 is sandwiched between ribs 14L and 15L that respectively project from the central wall surfaces 14y and 15y, the central part 101a is accommodated in the central accommodating part 11C. Spaces are left between the rib 14L and the central part 101a of the first-side extending part 101A and between the rib 15L and the central part 101a of the first-side extending part 101A. Such spaces reduce the resistance of inserting the bracket 101 into the accommodating part 11 (that is, slide resistance), thus facilitating assembling.

As shown in FIGS. 9 to 11, the central accommodating part 11C includes inner walls 14 and 15, lower connecting walls 14X and 15X, and the retainer engaging part 12. The inner walls 14 and 15 extend in the plate thickness direction 101y of the accommodated bracket 101 as shown in FIG. 13. The inner wall 15 is disposed on a first side in the plate thickness direction 101y of the accommodated bracket 101 (the left side in FIG. 13), whereas the inner wall 14 is disposed on a second side (the right side in FIG. 13), which is opposite to the first side. The inner walls 14 and 15 oppose to each other in the plate thickness direction 101y. The central wall surfaces 14y and 15y are opposing surfaces of the inner walls 14 and 15.

As shown in FIG. 13, each of the inner walls 14 and 15 is formed on both sides (that is, on upper and lower sides in FIG. 13) of the central part 101a of the accommodated bracket 101 in the widthwise direction 101z. The inner walls 14 and 14 on both sides in the widthwise direction 101z are connected to each other by the lower connecting wall 14X disposed under the inner walls 14 and 14. The inner walls 15 and 15 on both sides of the accommodated bracket 101 in the widthwise direction 101z are also connected to each other by the lower connecting wall 15X disposed under the inner walls 15 and 15.

As shown in FIG. 4, the retainer engaging part 12 is an elastic wall that is formed to extend upward from the lower connecting wall 15X shown in FIGS. 9 and 12 so as not to contact or so as not to be connected to the inner walls 15 and 15 in the widthwise direction 101z. An upper side of the retainer engaging part 12 with respect to the side of the lower connecting wall 15X can elastically deform in the plate thickness direction 101y of the accommodated bracket 101 as shown in FIGS. 9 to 11. Additionally, the retainer engaging part 12 includes, at its distal end side (at its upper end side), an engaging claw 13 that projects toward the accommodated bracket 101.

The accommodating part 11 includes the end accommodating part 11D (see FIGS. 12 and 13) as well as the central accommodating part 11C. As the accommodating part 11 includes the end accommodating part 11D, the accommodating part 11 can accommodate the bracket 101 if the bracket 101 includes a bent end part 101d at one or both of the end parts 101b in the widthwise direction 101z (for example, see FIG. 21).

Figure 21:
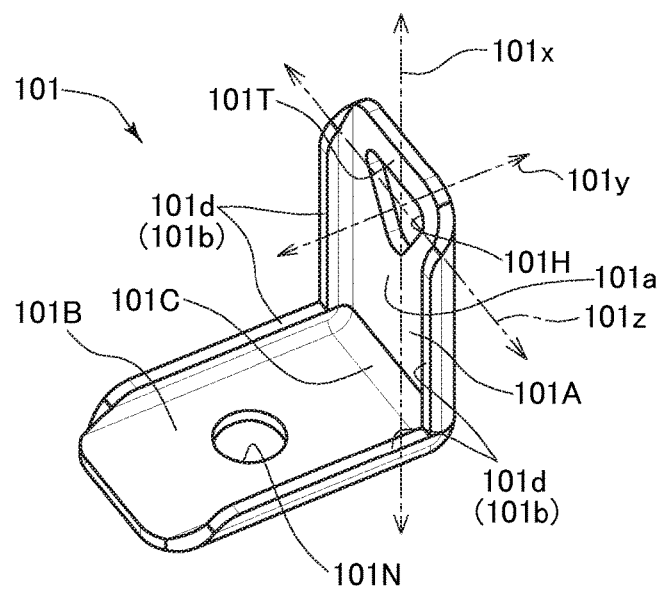
FIG. 21 is a perspective view of a bracket that is different from the bracket shown in FIG. 1.

The bracket 101 shown in FIG. 21 is different from the bracket shown in FIG. 5. The bracket 101 shown in FIG. 21 is a plate with a U-shaped cross-section and includes, at least in the first-side extending part 101A, the central part 101a in the widthwise direction 101z and the bent end part 101d that is bent on both sides of the central part 101a in the widthwise direction 101z in the plate thickness direction 101y of the central part 101a. The bracket 101 shown in FIG. 21 includes a bent part 101C that is disposed between the first-side extending part 101A and the second-side extending part 101B to bend the parts 101A and 101B at 90 degrees.

Figure 22:
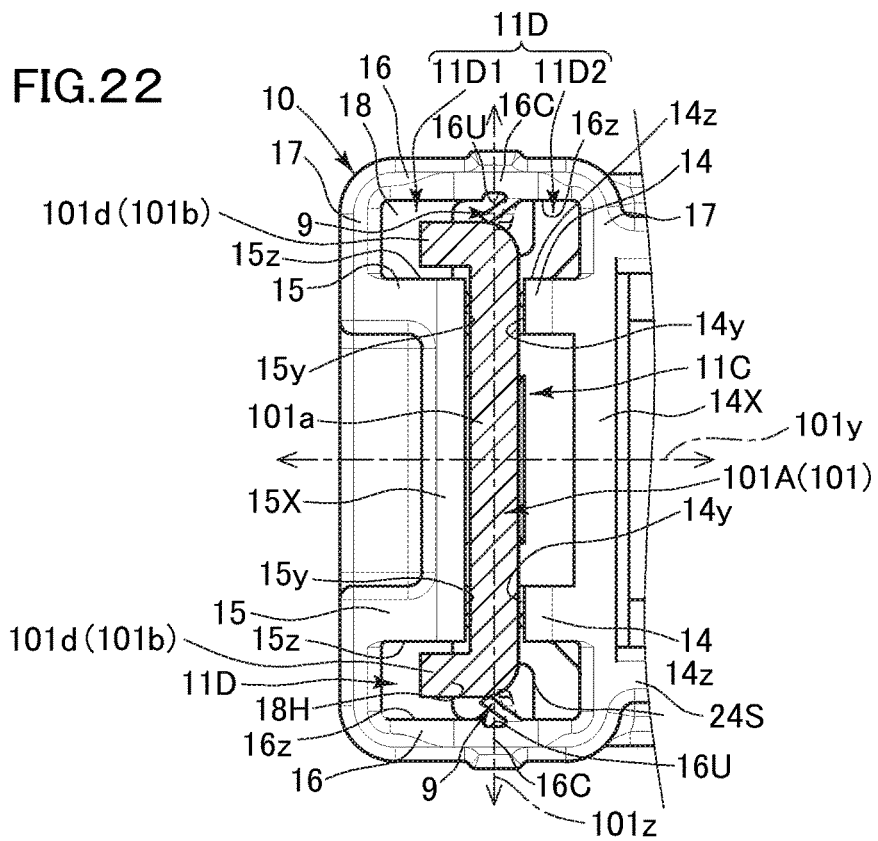
FIG. 22 shows a cross-section that is the same as the cross-section taken along the line XIII-XIII of FIG. 3 in a state where the bracket shown in FIG. 21 is assembled to the vehicle component shown in FIG. 1.
Figure 23:
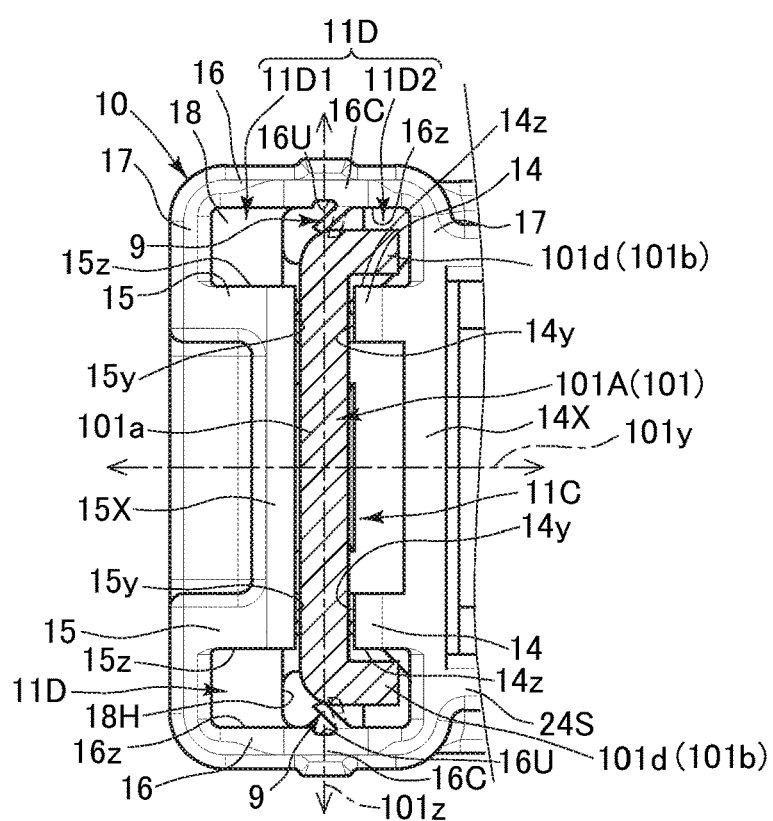
FIG. 23 shows the cross-section that is the same as the cross-section taken along the line XIII-XIII of FIG. 3 in a state where the bracket shown in FIG. 22 is reversely assembled to the vehicle component shown in FIG. 1.

The end accommodating part 11D includes a first bent-end accommodating part 11D1 and a second bent-end accommodating part 11D2, as shown in FIG. 12. The first bent-end accommodating part 11D1 extends from both end sides of the central accommodating part 11C (that is, both end sides of the accommodated bracket 101 in the widthwise direction 101z) toward the first side in the plate thickness direction 101y of the accommodated bracket (the left side in FIG. 12). The second bent-end accommodating part 11D2 extends from both end sides of the central accommodating part 11C toward the second side in the plate thickness direction 101y (the right side in FIG. 12), which is opposite to the first side. As the end accommodating part 11D includes these first bent-end accommodating part 11D1 and second bent-end accommodating part 11D2, the accommodating part 11 can accommodate the bracket 101 if the bent end part 101d of the bracket 101 projects toward the first bent-end accommodating part 11D1 or the second bent-end accommodating part 11D2 (see FIGS. 22 and 23).

Figure 24:
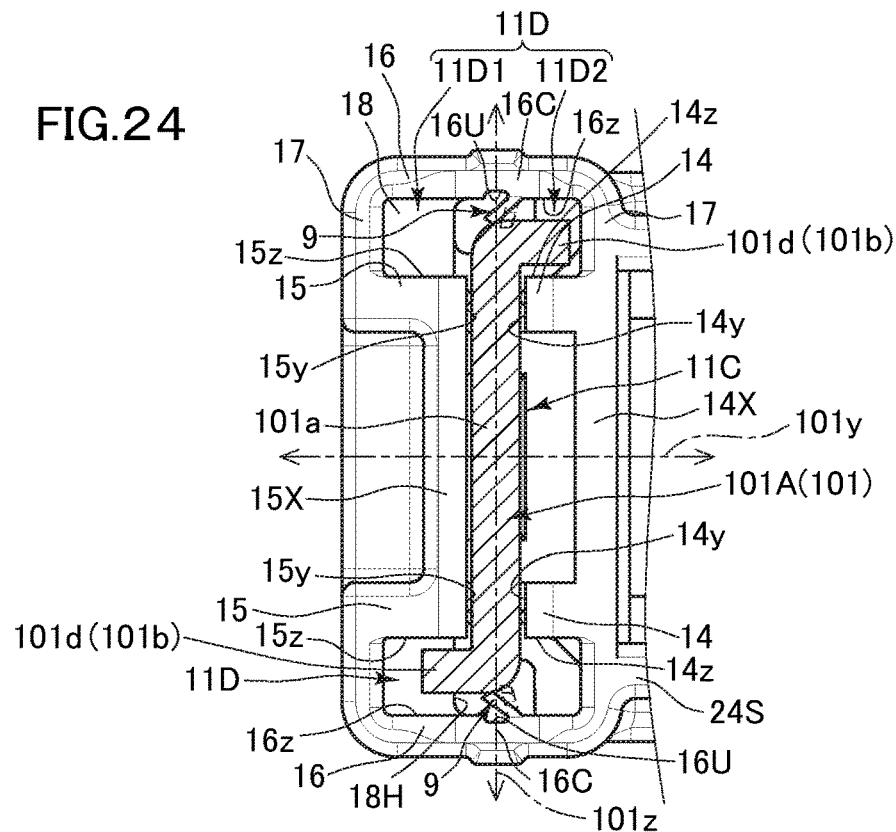
FIG. 24 shows the cross-section that is the same as the cross-section taken along the line XIII-XIII of FIG. 3 in a state where a bracket that is different from the brackets shown in FIGS. 5 and 22 is assembled to the vehicle component shown in FIG. 1.

Additionally, if the bracket 101 has an S-shaped cross section in which the bent end parts 101d on both sides in the widthwise direction 101z are bent in opposite directions in the plate thickness direction 101y as shown in FIG. 24, the accommodating part 11 can accommodate such a bracket 101 as well as the bracket 101 with a U-shaped cross-section described above. In this case, the bent end parts 101d are accommodated in the bent-end accommodating parts 11D1 and 11D2 and the central part 101a is accommodated in the central accommodating part 11C, so that the entire bracket 101 is accommodated in the accommodating part 11. If each bent end part 101d is bent in the opposite direction to the direction shown in FIG. 24, the accommodating part 11 can accommodate such a bracket.

Figure 25:
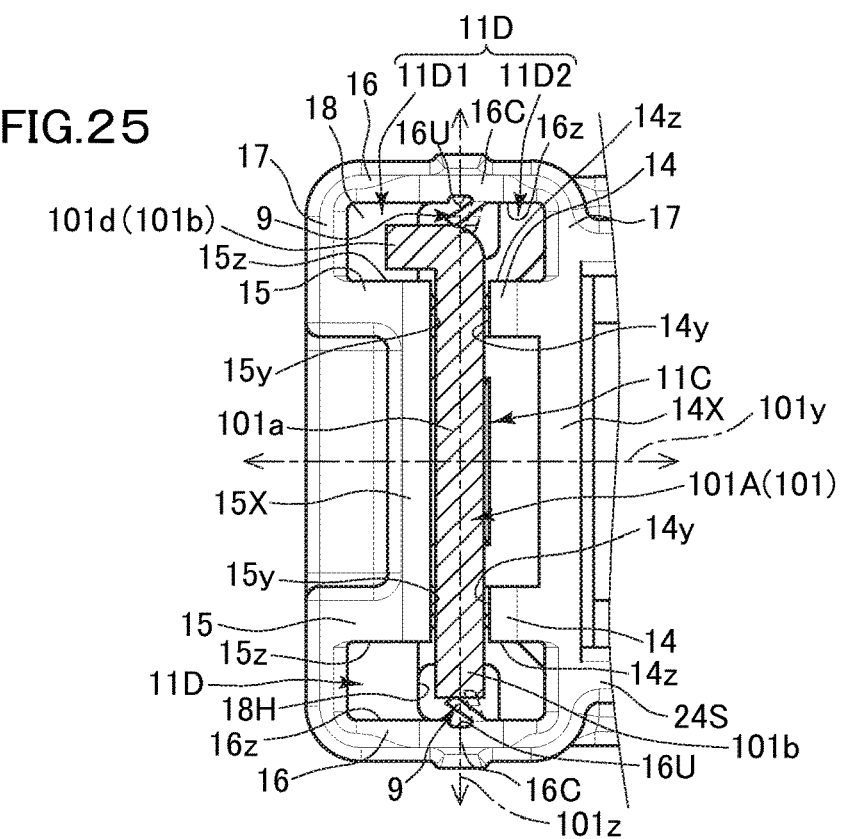
FIG. 25 shows the cross-section that is the same as the cross-section taken along the line XIII-XIII of FIG. 3 in a state where a bracket that is different from the brackets shown in FIGS. 5, 21, and 24 is reversely assembled to the vehicle component shown in FIG. 1.
Figure 26:
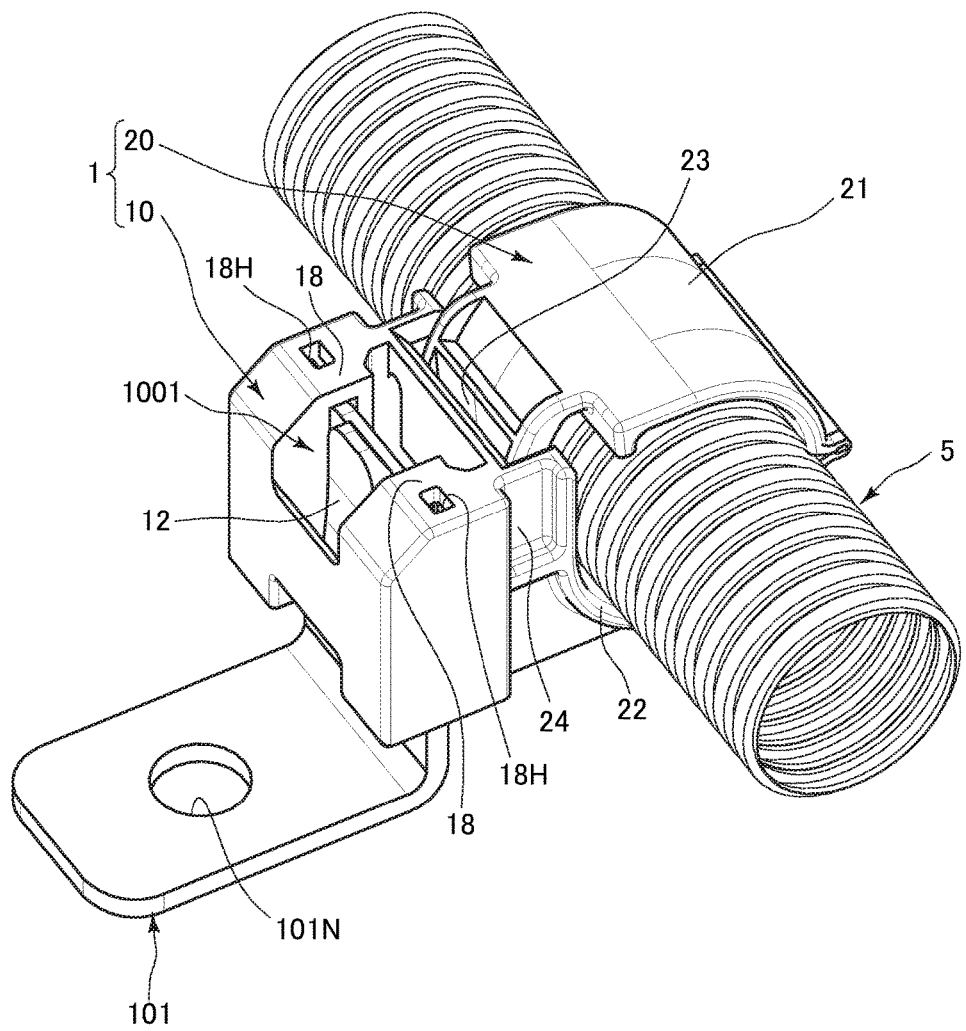
FIG. 26 is a perspective view of a state where a vehicle component including a bracket assembling mechanism according to a second embodiment of this invention holds a predetermined member.

As shown in FIG. 25, if the bracket 101 has an L-shaped cross-section in which the bent end part 101d is formed only on one side in the widthwise direction 101z, the accommodating part 11 can accommodate such a bracket 101 as well as the bracket 101 with a U-shaped cross-section or an S-shaped cross-section described above. In this case, the bent end part 101d is accommodated in the bent-end accommodating part 11D1 or 11D2 and the central part 101a is accommodated in the central accommodating part 11C, so that the entire bracket 101 is accommodated in the accommodating part 11.

The end accommodating part 11D is surrounded by the inner walls 14 and 15, an outer wall 16, and connecting walls 17 and 17.

The inner walls 14 and 15 respectively include side wall surfaces 14z and 15z that oppose the accommodated bracket 101 having the bent end part 101d in the widthwise direction 101z of the bracket 101. Specifically, the inner walls 14 and 15 respectively include the side wall surfaces 14z and 15z, and when the bracket 101 having the bent end part 101d is accommodated in the accommodating part 11, the side wall surfaces 14z and 15z oppose the inner side of the bent end part 101d of the bracket 101 in the widthwise direction 101z, as shown in FIGS. 22 to 25. The side wall surface 14z is an inner wall surface that extends on the second side in the plate thickness direction 101y of the accommodated bracket, whereas the side wall surface 15z is an inner wall surface that extends on the first side in the plate thickness direction 101y of the accommodated bracket.

The outer wall 16 includes a side wall surface 16z that opposes the accommodated bracket 101 in the widthwise direction 101z. Specifically, the outer wall 16 includes the side wall surface 16z and when the bracket 101 that does not include the bent end part 101d shown in FIG. 5 is accommodated in the accommodating part 11, the side wall surface 16z opposes the bracket 101 on the outer side of the bracket 101 in the widthwise direction 101z (see FIG. 13). Additionally, when the bracket 101 that includes the bent end part 101d shown in FIG. 21 is accommodated in the accommodating part 11, the side wall surface 16z also opposes the bracket 101 on the outer side of the bracket 101 in the widthwise direction 101z (see FIGS. 22 to 25). The side wall surface 16z is an inner wall surface that extends from the first side in the plate thickness direction 101y of the accommodated bracket toward the second side.

The connecting walls 17 and 17 connect the inner walls 14 and 15 to the outer wall 16 on the first and second sides in the plate thickness direction 101y of the accommodated bracket 101. The first bent-end accommodating part 11D1 is formed by the inner wall 15, the connecting wall 17, and the outer wall 16 on the first side in the plate thickness direction 101y of the accommodated bracket 101 to be recessed toward the first side. On the other hand, the second bent-end accommodating part 11D2 is formed by the inner wall 14, the connecting wall 17, and the outer wall 16 on the second side in the plate thickness direction 101y of the accommodated bracket 101 to be recessed toward the second side. As shown in FIGS. 12 and 13, the accommodating part 11 includes an accommodating space with an H-shaped cross-section formed by the bent-end accommodating part 11D1 on the first side, the second bent-end accommodating part 11D2 on the second side, and the central accommodating part 11C.

The accommodating part 11 includes a bottom wall 18 that forms at least the bottom surface of the end accommodating part 11D on its upper end side (that is, on the inner side in the movement direction 101X of the bracket 101: see FIG. 9). The bottom wall 18 is formed to cover not only the upper end sides of the first bent-end accommodating part 11D1 and the second bent-end accommodating part 11D2 but also an end part of the central accommodating part 11C (that is, an end part of the central accommodating part 11C on the side of the end accommodating part 11D).

An operation of assembling the bracket 101 to the assembling part 10 is described with reference to FIGS. 9 to 13.

The first-side extending part 101A of the bracket 101 is accommodated in the accommodating part 11 from the lower opening 11H formed at a lower end part of the accommodating part 11 toward an upper direction (that is, the bracket movement direction 101X). At this time, the central part 101a of the bracket 101 is moved into the central accommodating part 11C of the accommodating part 11, and both end parts 101b of the bracket 101 are moved into the corresponding accommodating parts 11D.

As the bracket 101 is moved within the accommodating part 11 in the movement direction 101X, the bracket 101 abuts against the engaging claw 13 that projects from the retainer engaging part 12 and the movement of the bracket 101 is hindered. However, the bracket 101 is further pressed upward and thus the retainer engaging part 12 is bent in the plate thickness direction 101y of the bracket 101 as shown in FIG. 10, so that the bracket 101 can be further moved. When the bracket 101 is finally moved to a predetermined engaging position, the engaging claw 13 of the retainer engaging part 12 is moved into the engaging hole 101H and then the retainer engaging part 12 elastically returns to its original shape. The engaging claw 13 having been moved into the engaging hole 101H opposes an inner peripheral upper surface 101Ha of the engaging hole 101H in the movement direction 101X of the bracket 101, and when the bracket 101 is moved in the opposite direction to the movement direction 101X, the engaging claw 13 abuts against (is locked on) the inner peripheral upper surface (a locking surface) 101Ha to hinder the movement of the bracket 101. The bracket 101 is thus retained and engaged, that is, the downward removal of the bracket 101 from the accommodating part 11 is prevented.

The accommodating part 11 includes an elastic projecting part 9 that projects from the side wall surface 16z toward the accommodating space within the end accommodating part 11D.

As shown in FIG. 13, when the bracket 101 is accommodated in the accommodating part 11, the distal end part of the elastic projecting part 9 is pressed against the end part 101b of the bracket 101 in the widthwise direction 101z to be bent and elastically deformed in the plate thickness direction 101y of the bracket 101 (the left direction in FIG. 13). Consequently, when the bracket 101 is accommodated in the accommodating part 11, the bracket 101 is pressed in the widthwise direction 101z and thus it is possible to prevent the bracket 101 from shaking within the accommodating part 11.

When the bracket 101 shown in FIG. 5 is accommodated in the accommodating part 11, the distal end part of the elastic projecting part 9 is bent and elastically deformed to press the side surface of the bracket 101 from outside to inside in the widthwise direction 101z, as shown in FIG. 13. Meanwhile, when the bracket 101 having the bent end part 101d shown in FIG. 21 is accommodated in the accommodating part 11, the distal end part of the elastic projecting part 9 is bent and elastically deformed to press the bent end part 101d of the bracket 101 from outside to inside in the widthwise direction 101z, as shown in FIGS. 22 to 25. The direction that the elastic projecting part 9 is elastically deformed, that is, inclined is the same in both cases (that is, the left direction in FIGS. 13 and 22 to 25).

The side wall surface 16z is an inner wall surface of the outer wall 16 that faces the bent end part 101d of the accommodated bracket 101. The elastic projecting part 9 projects from an intermediate part 16C between the first bent-end accommodating part 11D1 and the second bent-end accommodating part 11D2 in the side wall surface 16z (see FIGS. 12 and 13) toward the central part 101a of the accommodated bracket 101 in the widthwise direction 101z.

As shown in FIGS. 12 and 13, the elastic projecting part 9 projects so as to be inclined from its proximal end in a manner that its distal end leans toward the first side in the plate thickness direction 101y of the accommodated bracket 101 (the left side in FIG. 13). Specifically, the elastic projecting part 9 projects from a position that is shifted to the second side from an intermediate position (a position on the chain line 101z in FIG. 13) of the first bent-end accommodating part 11D1 and the second bent-end accommodating part 11D2 in the intermediate part 16C between the first bent-end accommodating part 11D1 and the second bent-end accommodating part 11D2 in the side wall surface 16z. When the bracket 101 is not accommodated in the accommodating part 11, as shown in FIG. 12, the projecting distal end of the elastic projecting part 9 is not extended over the intermediate position but positioned on the proximal end side with respect to the intermediate position. When the bracket 101 is accommodated in the accommodating part 11, as shown in FIG. 13, the projecting distal end of the elastic projecting part 9 reaches the opposite side to the proximal end side over the intermediate position. The elastic projecting part 9 is thus formed to surely press the side surface of the accommodated bracket 101. The position of the proximal end part of the elastic projecting part 9 and the inclination direction of the elastic projecting part 9 may be opposite to the position and the direction described above.

Figure 14:
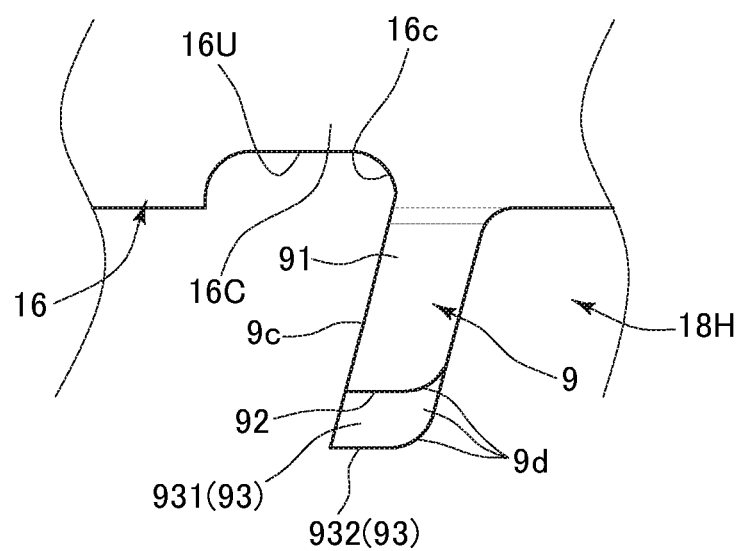
FIG. 14 is a partially enlarged view of FIG. 12.

As shown in FIG. 14, the side wall surface 16z includes a recess 16U on the side of the proximal end part of the elastic projecting part 9 toward which the elastic projecting part 9 is inclined. The recess 16U has an inner wall surface 16c that is continuous with an inclined lower surface 9c of the elastic projecting part 9. Such a recess 16U enables the elastic projecting part 9 to be easily inclined and further elastically deformed toward the inclined side.

As shown in FIG. 14, the elastic projecting part 9 includes a deformation inducing surface 9d at least on the outer side of the projecting end surface in the bracket movement direction 101X, that is to say, on an abutment surface that abuts first against the bracket 101 that is to be accommodated in the accommodating part 11. The deformation inducing surface 9d is shaped so as to, when abutting against and being pressed against the bracket 101, induce elastic deformation toward a predetermined side, that is, toward the first or second side in the plate thickness direction 101y of the bracket 101. In the elastic projecting part 9, a plurality of the deformation inducing surfaces 9d that induce elastic deformation toward a predetermined side in the plate thickness direction 101y when the bracket 101 is accommodated in the accommodating part 11 are formed on the entire portion of the projecting distal end surface in the bracket movement direction 101X. The deformation inducing surface 9d is a curved surface formed at a corner portion of the projecting distal end of the elastic projecting part 9 on the opposite side to the inclined side. As the deformation inducing surface 9d has such a curved shape, when being pressed according to the accommodation of the bracket 101, the elastic projecting part 9 is induced to be smoothly inclined.

Additionally, the elastic projecting part 9 is an elastic rib that extends long in the bracket movement direction 101X. The long elastic projecting part 9 is pressed against the bracket 101 that is also long in the bracket movement direction 101X, and thus it is possible to reliably prevent the bracket 101 from shaking.

The elastic projecting part 9 is connected to only the side wall surface 16z and is not connected to other wall surfaces on the projecting direction side and the side perpendicular to the projecting direction. That is, the distal end of the elastic projecting part 9 that is a long projection in the bracket movement direction 101X functions as a free end on its entire portion in the longitudinal direction. Consequently, it is possible to cause the elastic projecting part 9 to be surely bent and pressed against the bracket, thus reliably preventing shaking of the bracket.

Figure 15:
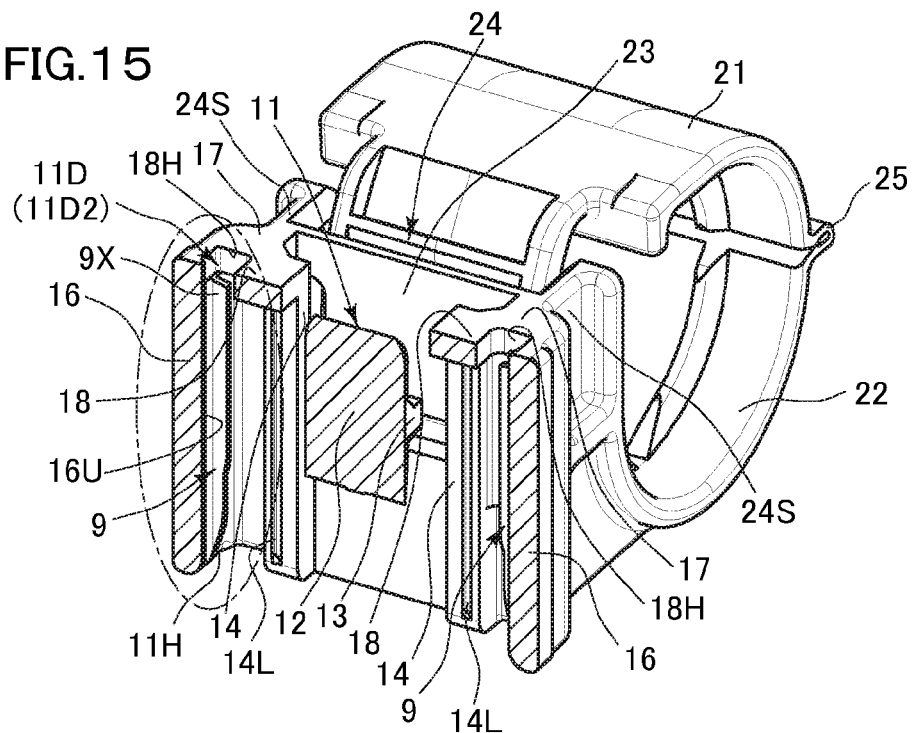
FIG. 15 is a perspective, cross-sectional view taken along a line XV-XV of FIG. 12.
Figure 16:
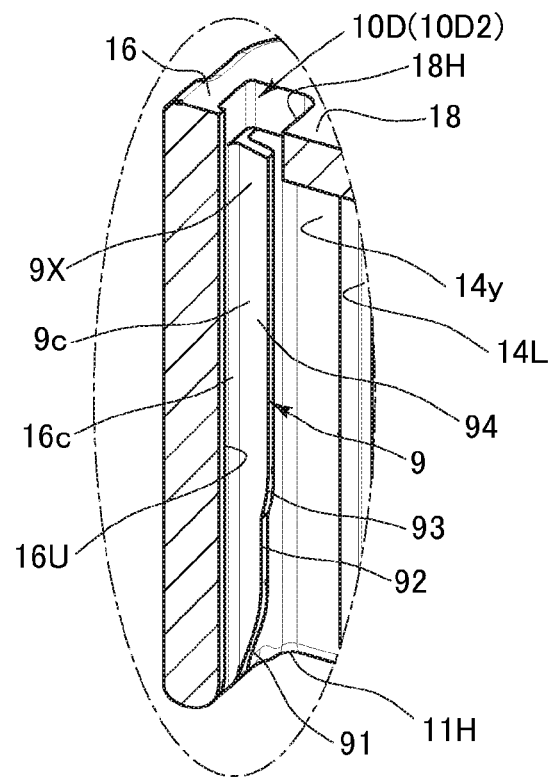
FIG. 16 is a partially enlarged view of FIG. 15.
Figure 17:
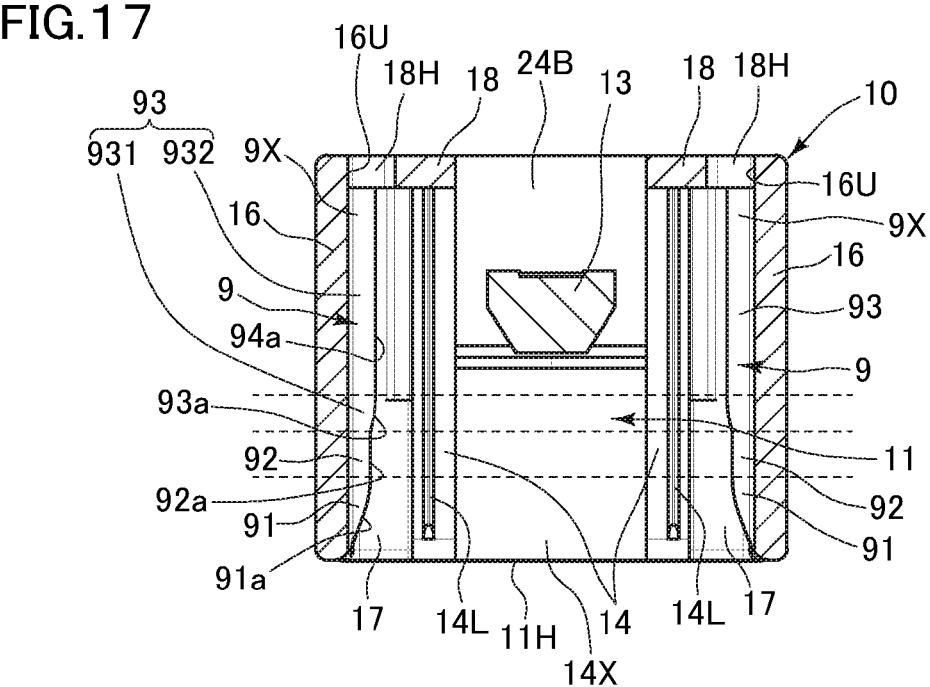
FIG. 17 is a cross-sectional view taken along a line XVII-XVII of FIG. 12.

Specifically, as shown in FIGS. 4, 12, and 15, the inner walls 14 and 15 are disposed on the projecting side of the elastic projecting part 9, the bottom wall 18 is disposed on the inner side in the bracket movement direction 101X, and the connecting walls 17 and 17 are disposed on both sides in the direction perpendicular to the projecting direction and the bracket movement direction 101X. However, the elastic projecting part 9 is not connected to these walls and does not contact these walls. As shown in FIGS. 15 and 16, the bottom wall 18 includes an opening 18H near an end part 9X of the elastic projecting part 9 on the inner side in the bracket movement direction 101X. This opening 18H enables the bottom wall 18 to achieve non-connection and non-contact with the elastic projecting part 9. The lower opening 11H described above is formed on the outer side of the elastic projecting part 9 in the bracket movement direction 101X, and this lower opening 11H achieves non-connection and non-contact with the elastic projecting part 9.

Figure 18:
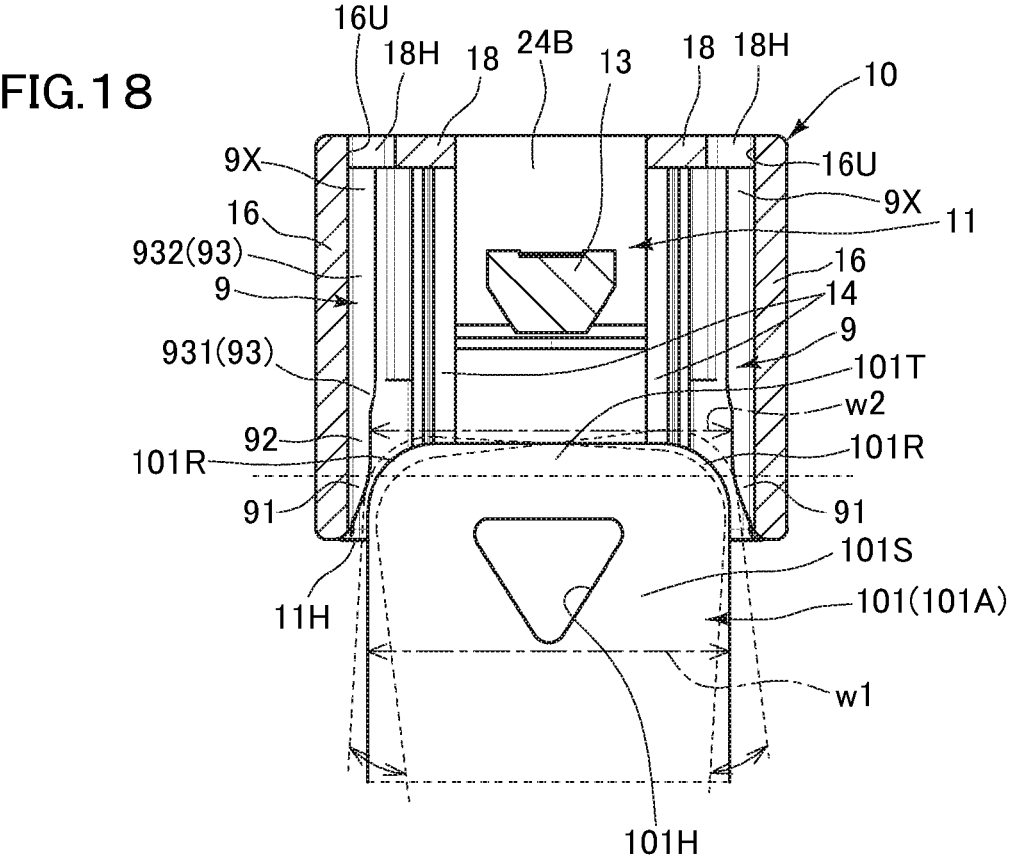
FIG. 18 shows the cross-section taken along the line XVII-XVII of FIG. 12 in the process of assembling the bracket on the vehicle component shown in FIG. 1.

In this example, the elastic projecting part 9 is formed on both end sides in the widthwise direction 101z of the accommodated bracket 101. The elastic projecting parts 9 and 9 on both end sides respectively include first projecting parts 91 and 91 (see FIG. 18), second projecting parts (see FIG. 19), and third projecting parts 93 and 93. Each of the first projecting parts 91 and 91 has such a projection amount as to be capable of receiving the bracket 101 to be accommodated in the accommodating part 11 while keeping a space equal to or larger than a predetermined width between each of the first projecting parts 91 and 91 in an elastically undeformed state, and each of the end parts 101b and 101b of the bracket 101 in the widthwise direction 101z. Each of the second projecting parts 92 and 92 is continuous with each of the first projecting parts 91 and 91 on the inner side in the bracket movement direction 101X, and has such a projection amount as to be capable of receiving the bracket 101 substantially without any space between each of the second projecting parts 92 and 92 in an elastically undeformed state, and each of the end parts 101b of the bracket 101 in the widthwise direction 101z. Each of the third projecting parts 93 and 93 is continuous with each of the second projecting parts 92 and 92 on the inner side in the bracket movement direction 101X, and has such a projection amount as to be pressed against each of the end parts of the bracket 101 in the widthwise direction 101z and elastically deformed to receive the bracket 101.

The first projecting part 91, 91 is formed as an inclined projecting part whose projection amount increases from the outer side toward the inner side in the bracket movement direction 101X. When the bracket 101 enters between a pair of the first projecting parts 91 and 91, the bracket 101 is guided toward the inner side in the bracket movement direction 101X. However, as indicated by broken lines in FIG. 18, the orientation of the bracket 101 is not set at the time of being sandwiched between the first projecting parts 91 and 91.

Figure 19:
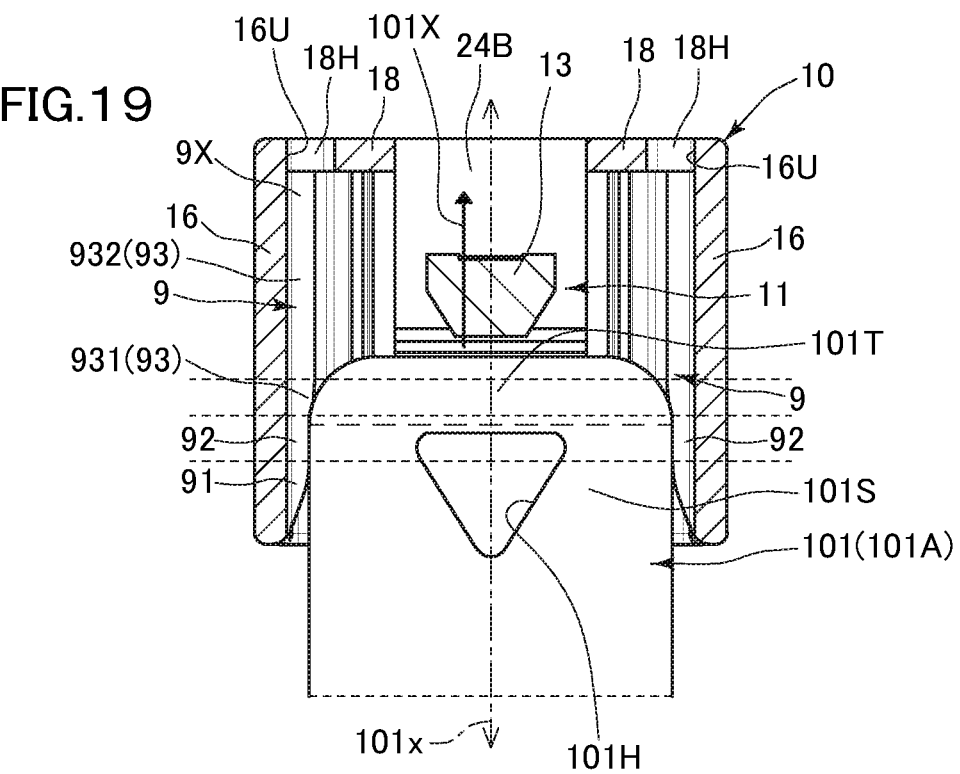
FIG. 19 is a view subsequent to FIG. 18.

As described above, each of the second projecting parts 92 and 92 has such a projection amount as to receive the bracket 101 substantially without any space between each of the second projecting parts 92 and 92 in an elastically undeformed state and each of the end parts of the bracket 101 in the widthwise direction 101$z$. Specifically, at the time of design, the length w1 of the bracket 101 in the widthwise direction 101$z$ is equal to the distance w2 between the opposing second projecting parts 92 on both sides, and it is assumed that the bracket 101 enters between the second projecting parts 92 on both sides without any space. In practice, however, manufacturing errors are present and thus for the difference between w1 and w2, an error of 0.58 mm or less, preferably an error of 0.2 mm or less is allowed. The description "substantially without any space" implies such errors. As a main part 101S of the bracket 101 that is continuous with a distal end part 101T with chamfered corners enters between the opposing second projecting parts 92 and 92, the orientation of the bracket 101 is set as shown in FIG. 19. That is, as the bracket 101 reaches the position of the second projecting part 92, the axial direction 101$x$ along which the bracket 101 (the first-side extending part) moves, which is perpendicular to the plate thickness direction 101$y$ and the widthwise direction 101$z$ of the bracket 101, matches the bracket movement direction 101X in the accommodating part 11.

Each of the third projecting parts 93 and 93 includes an inclined projecting part 931 that is continuous with each of the second projecting parts 92 and 92 on the inner side in the bracket movement direction 101X and whose projection amount increases from the outer side toward the inner side in the bracket movement direction 101X. The bracket 101 in the orientation set at the position of the second projecting part 92, 92, is moved between the inclined projecting parts 931 and 931. The bracket 101 having been moved between the opposing inclined projecting parts 931 and 931 then elastically deforms the elastic projecting parts 9 and 9 in an inclined manner. As the bracket 101 is moved toward the inner side in the bracket movement direction 101X, the inclination angle of the elastic projecting parts 9 and 9 is increased.

The third projecting part 93, 93 includes a most-projecting part 932, 932 that is continuous with the inclined projecting part 931, 931 on the inner side in the bracket movement direction 101X and that has the maximum and constant projection amount. The bracket 101 gradually increases the inclination angle of the elastic projecting parts 9 and 9 between the opposing inclined projecting parts 931 and 931. When the bracket 101 enters between the most-projecting parts 932 and 932, the elastic projecting parts 9 and 9 are not further elastically deformed in an inclined manner and a certain inclination angle is kept. As a certain inclination angle is kept, the bracket 101 is pressed by elastic return force of the elastic projecting parts 9 and 9, and thus it is possible to prevent the bracket 101 from shaking within the accommodating part 11.

Figure 20:
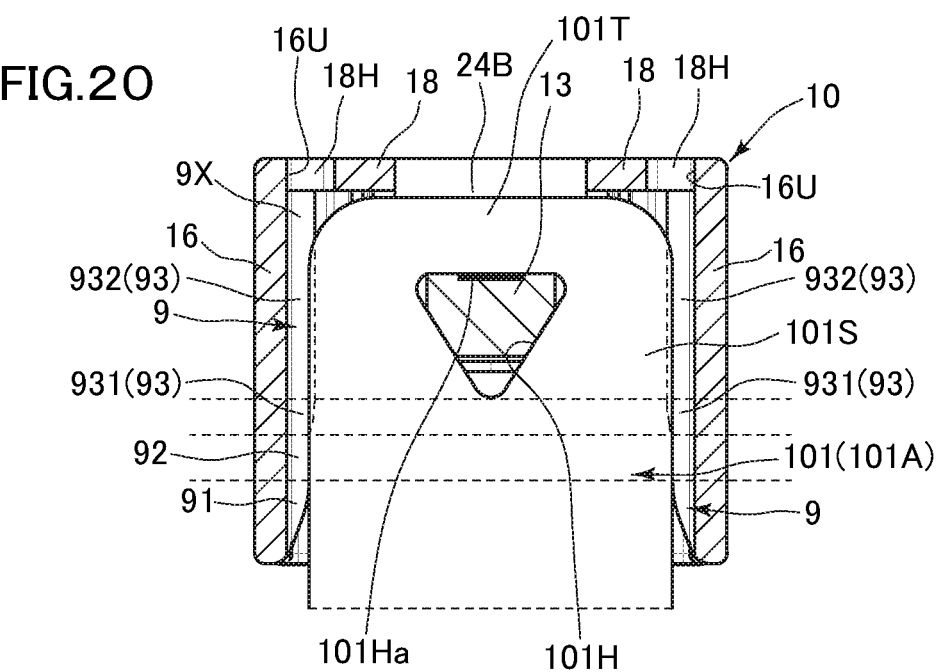
FIG. 20 is a view subsequent to FIG. 19.

In accommodating the bracket 101 in the accommodating part 11, the retainer engaging part 12 is elastically deformed by being pressed by the bracket 101 (see FIG. 10) after the bracket 101 (specifically, the main part 101S) is moved to the position of the second projecting part 92, 92 of the elastic projecting part 9, 9. The bracket 101 in a predetermined orientation can elastically deform the retainer engaging part 12 reliably and when the engaging hole 101H of the bracket 101 is moved to the position of the engaging claw 13, the engaging claw 13 reliably enters the engaging hole 101H by elastic return of the retainer engaging part 12. The retainer engaging part 12 is elastically deformed (see FIG. 10) or elastically returned to its original shape (see FIG. 20) when the bracket 101 (specifically, the main part 101S) is moved to the position of the third projecting part 93, 93 of the elastic projecting part 9, 9 (more specifically, the position of the most-projecting part 932, 932).

The retainer engaging part 12 is disposed on the side of the central wall surface 15$y$, but as shown in FIG. 12, its distal end side is disposed in advance on the side of the central wall surface 14$y$ that opposes the central wall surface 15$y$ constituting the central accommodating part 11C. Specifically, the retainer engaging part 12 includes a distal end part 12T (see FIG. 9) that is closer to the distal end than the engaging claw 13 is, and is shaped in a manner that the distal end part 12T is within the accommodating space in the central accommodating part 11C. When the bracket 101 is engaged with and retained in the accommodating part 11, the distal end part 101T of the bracket 101 presses the distal end part 12T of the retainer engaging part 12 out of the accommodating space in the central accommodating part 11C (see FIG. 10). At this time, the retainer engaging part 12 keeps elastically deforming in the same direction as the direction when the bracket 101 is moved to the position of the retainer engaging part 12, and keeps pressing the accommodated bracket 101 against the central wall surface 14$y$ by elastic return force in the opposite direction to the direction of the elastic deformation. This pressing also contributes to preventing the accommodated bracket 101 from shaking.

As described above, the elastic projecting part 9 presses the bracket 101 accommodated in the accommodating part 11 in the widthwise direction 101$z$ in the first embodiment. It is thus possible to prevent the bracket 101 from shaking within the accommodating part 11. The elastic projecting part 9 can prevent shaking of the bracket 101 continuously because the elastic projecting part 9 continuously presses the bracket 101 in an elastically deformed state.

The arrangement direction of the accommodating part 11 of the bracket 101, the accommodating part 24 of the engaging part 23, and a gripping part (reference numerals 21 and 22) of the predetermined member 5 is aligned with the plate thickness direction 101$y$ of the bracket 101 accommodated in the accommodating part 11 (see FIG. 4) in the first embodiment. The vehicle holding component 1 thus tends to be long in the plate thickness direction 101$y$, and this hinders downsizing of the entire component. However, the elastic projecting part 9 extends in the widthwise direction 101$z$ of the bracket 101 accommodated in the accommodating part 11 and thus it is not necessary to increase the size of the component 1 in the plate thickness direction 101$y$ and it is possible to prevent the bracket 101 from shaking within the accommodating part 11. The end accommodating part 11D is formed in the accommodating part 11, and the elastic projecting part 9 for preventing shaking of the bracket 101 is formed to project into the accommodating space within the end accommodating part 11D in the first embodiment. Consequently, it is not necessary to increase the size of the component 1 in the widthwise direction 101$z$ of the accommodated bracket 101.

In the first embodiment, the direction that the elastic projecting part 9 is elastically deformed and bent (that is, the inclination direction) corresponds to the plate thickness direction 101$y$ of the bracket 101 accommodated in the accommodating part 11. The end accommodating part 11D includes an accommodating space that is long in the plate thickness direction 101$y$, and the elastic projecting part 9 is formed to project into the accommodating space. That is, the end accommodating part 11D functions to accommodate the bent end part 101$d$ of the bracket 101. At the same time, the accommodating space is long in the direction that the elastic projecting part 9 is bent and thus the end accommodating part 11D also functions to leave a space that is sufficiently large not to interfere with bending of the elastic projecting part 9.

While the first embodiment of this invention has been described, this is only an example and this invention is not limited thereto. A person skilled in the art could make various alterations such as additions and omissions without departing from the spirit and scope of the claims.

Embodiments that are different from the first embodiment and modifications of these embodiments are described below. Like reference numerals are used to indicate like parts with common functions and detailed descriptions thereof are omitted. The first embodiment may be implemented appropriately in combination with the following modifications and other embodiments as long as no technical contradiction arises.

Although the vehicle component 1 according to the first embodiment includes the assembling part 10 and the holding part 20 functioning as a functional part that performs a predetermined function, the holding part 20 may have other holding structures different from the holding structure described above. The holding part 20 may be other functional parts.

A second embodiment is described with reference to FIGS. 26 to 29.

Figure 27:
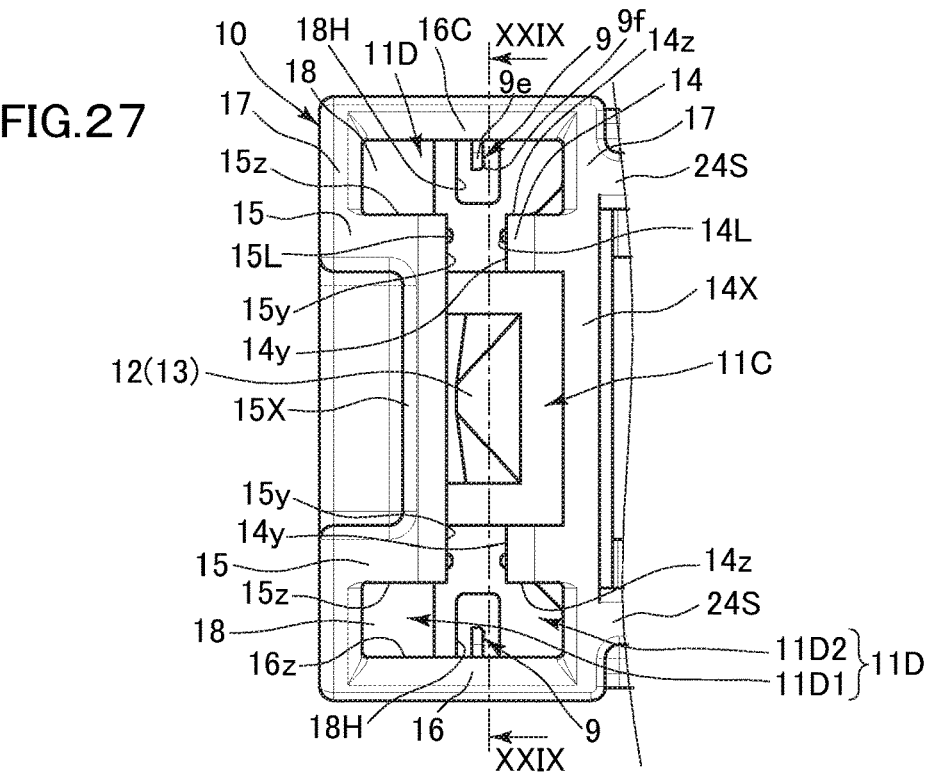
FIG. 27 is a bottom view of the vehicle component shown in FIG. 26 to which a bracket is not assembled.
Figure 28:
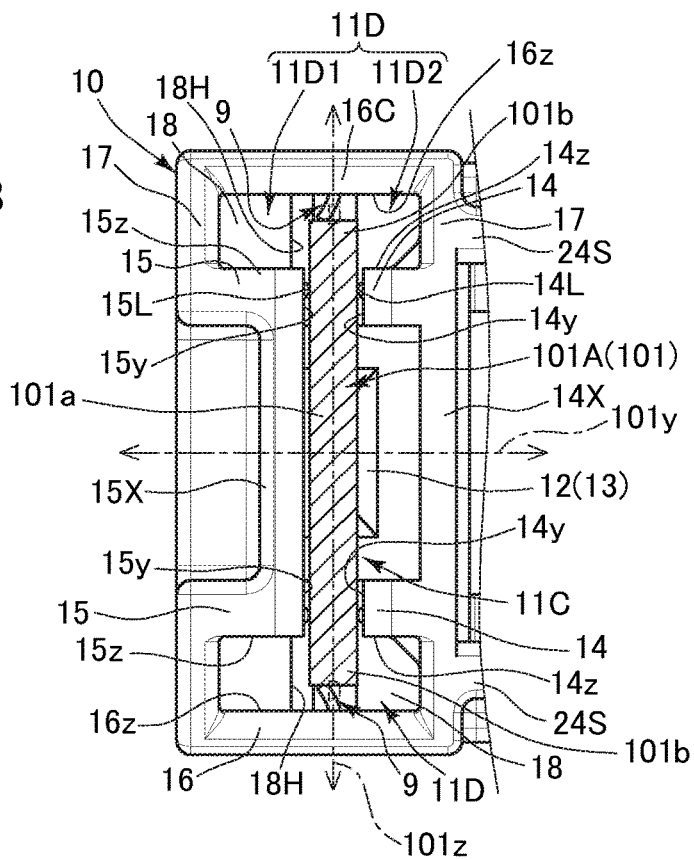
FIG. 28 shows the cross-section, taken along the line XIII-XIII of FIG. 3, of the bottom surface of the vehicle component shown in FIG. 26 having the bracket assembled thereto.

A bracket assembling mechanism 1001 according to the second embodiment is different from the bracket assembling mechanism 1000 according to the first embodiment mainly in the elastic projecting part 9 as shown in FIGS. 27 and 28. Similarly to the first embodiment, the elastic projecting part 9 projects from the intermediate part 16C between the first bent-end accommodating part 11D1 and the second bent-end accommodating part 11D2 in the side wall surface 16z toward the central part 101a of the accommodated bracket 101 in the widthwise direction 101z. The elastic projecting part 9 according to the second embodiment projects inwardly from the intermediate position (the position on the chain line 101z in FIG. 13) of the first bent-end accommodating part 11D1 and the second bent-end accommodating part 11D2 in the intermediate part 16C in the widthwise direction 101z of the accommodated bracket 101 without being inclined toward the first side or the second side in the plate thickness direction 101y of the bracket 101.

Figure 29:
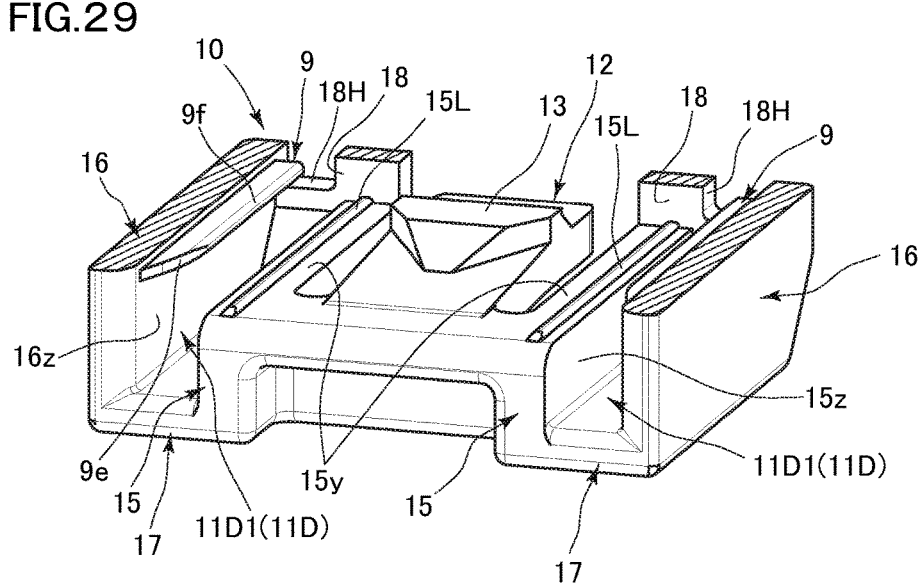
FIG. 29 is a cross-sectional view taken along a line XXIX-XXIX of FIG. 27.

As shown in FIG. 29, the elastic projecting part 9 according to the second embodiment is an elastic rib that extends in the bracket movement direction 101X in a quadrangular prism shape. A deformation inducing surface 9f is formed by chamfering corners of the elastic projecting part 9 on the opposite side (the right side in FIG. 28) to a predetermined side (the left side in FIG. 28) in the plate thickness direction 101y of the accommodated bracket 101, for the purpose of inducing inclined elastic deformation of the elastic projecting part 9 toward the predetermined side. The elastic projecting part 9 according to the second embodiment is cut so as to have a less projection amount on the outer side in the bracket movement direction 101X. A cut surface 9e allows the bracket 101 moving within the accommodating part 11 to be guided toward the inner side in the bracket movement direction 101X.

The first to third projecting parts 91 and 93 may be used for the elastic projecting part 9 according to the second embodiment. In the second embodiment, the recess 16U may be formed on the predetermined side of the elastic projecting part 9 (the left side in FIG. 28). The second embodiment may be applied to not only the plate bracket 101 shown in FIG. 26 but also the bracket 101 having the bent end part 101d shown in FIG. 21.

Figure 30:
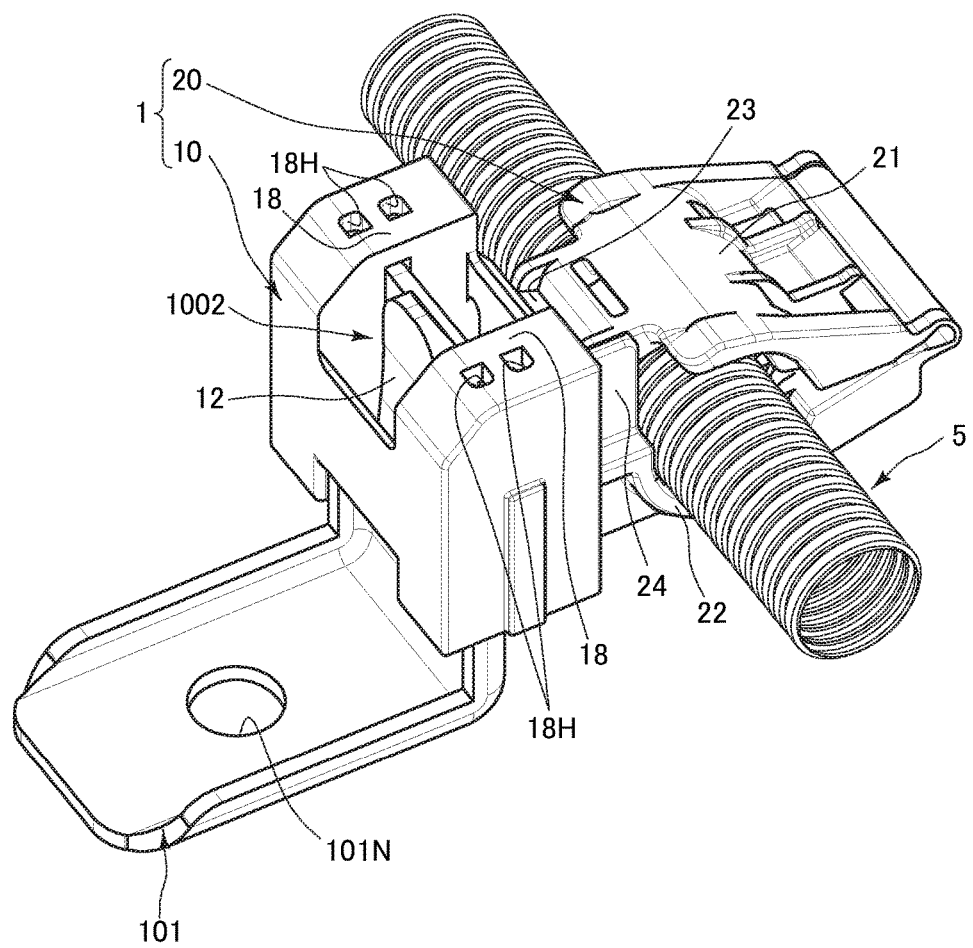
FIG. 30 is a perspective view of a state where a vehicle component including a bracket assembling mechanism according to a third embodiment of this invention holds a predetermined member.

Next, a third embodiment is described with reference to FIGS. 30 to 32.

Figure 31:
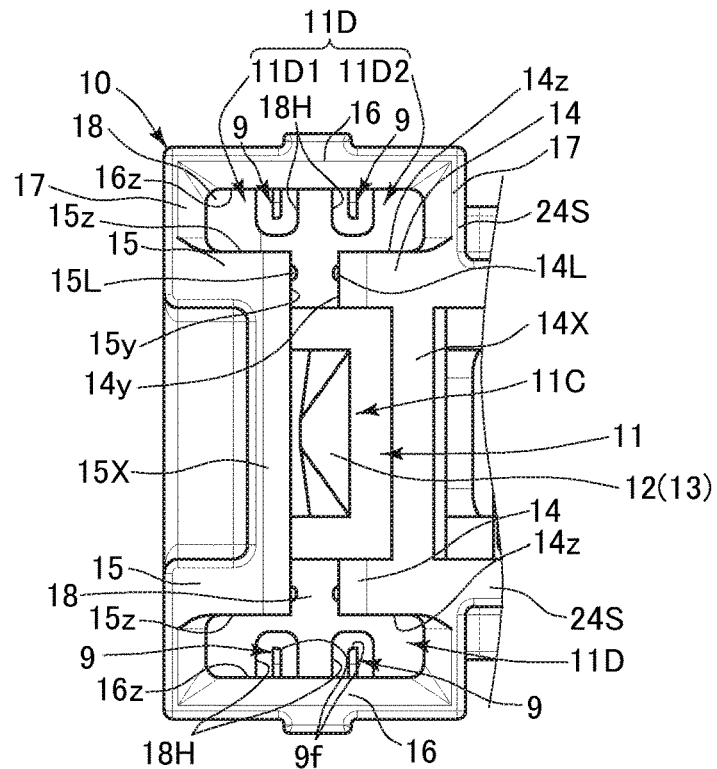
FIG. 31 is a bottom view of the vehicle component shown in FIG. 30 to which a bracket is not assembled.
Figure 32:
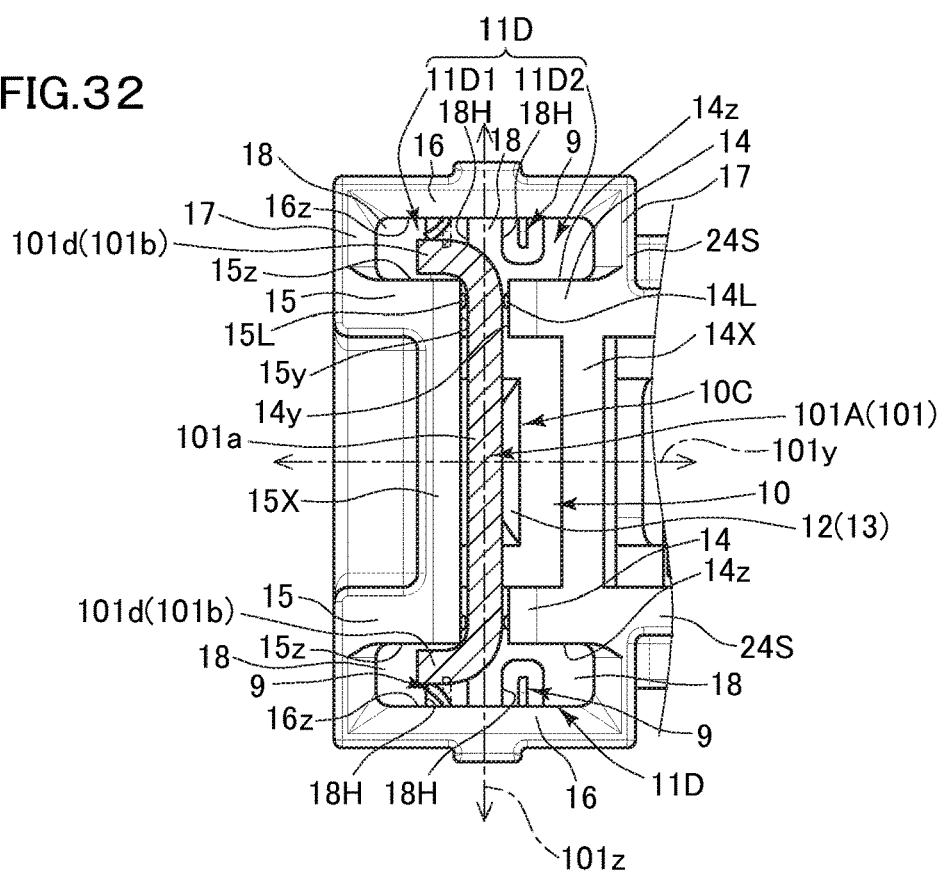
FIG. 32 shows the cross-section, taken along the line XIII-XIII of FIG. 3, of the bottom surface of the vehicle component shown in FIG. 30 having the bracket assembled thereto.

A bracket assembling mechanism 1002 according to the third embodiment is different from the bracket assembling mechanism 1000 according to the first embodiment mainly in the elastic projecting part 9 as shown in FIGS. 31 and 32. Similarly to the first embodiment, the elastic projecting part 9 according to the third embodiment projects from the side wall surface 16z toward the central part 101a of the accommodated bracket 101 in the widthwise direction 101z. The elastic projecting part 9 according to the third is formed in the first bent-end accommodating part 11D1 and the second bent-end accommodating part 11D2. That is, two elastic projecting parts 9 according to the third embodiment are formed on the side wall surface 16z on the first side and the second side in the plate thickness direction 101y of the accommodated bracket 101.

Two openings 18H in the bottom wall part 18 are provided on the first side and the second side so as to correspond to the elastic projecting parts 9 on the first side and the second side in the plate thickness direction 101y of the accommodated bracket 101.

The elastic projecting part 9 according to the third embodiment is an elastic rib that extends in the bracket movement direction 101X in a quadrangular prism shape, which is similar to that of the second embodiment. Among the elastic projecting parts 9 according to the third embodiment, the elastic projecting part 9 on the first side in the plate thickness direction 101y of the accommodated bracket 101 includes a deformation inducing surface 9f that is formed by chamfering corners on the second side opposite to the first side, for the purpose of inducing inclined elastic deformation of the elastic projecting part 9 toward the first side. On the other hand, among the elastic projecting parts 9 according to the third embodiment, the elastic projecting part 9 on the second side in the plate thickness direction 101y of the accommodated bracket 101 includes a deformation inducing surface 9f that is formed by chamfering corners on the first side opposite to the second side, for the purpose of inducing inclined elastic deformation of the elastic projecting part 9 toward the second side. These elastic projecting parts 9 include a cut surface that is similar to the cut surface of the second embodiment and cut so as to have a less projection amount on the outer side in the bracket movement direction 101X.

Next, a modification of the third embodiment is described with reference to FIGS. 33 and 34.

Figure 33:
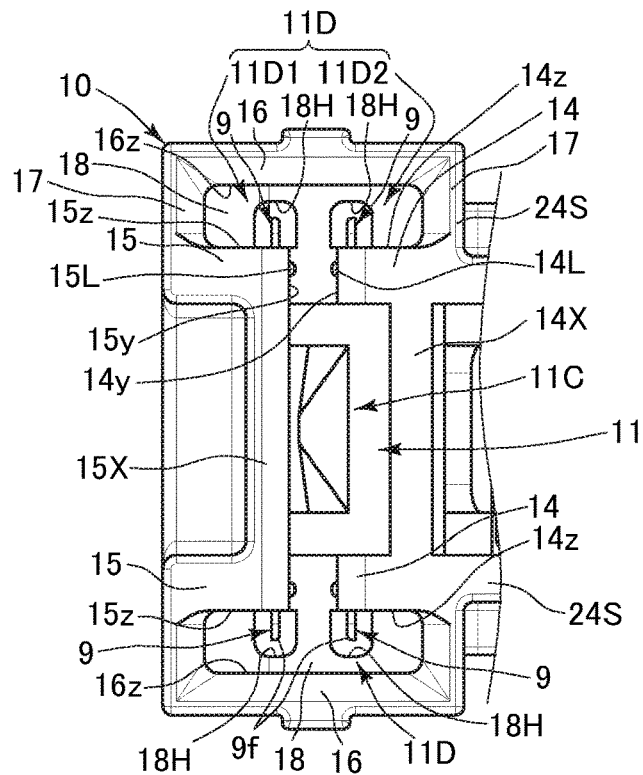
FIG. 33 is a bottom surface of a vehicle component to which a bracket is not assembled, including a bracket assembling mechanism according to a modification of the third embodiment shown in FIG. 30.
Figure 34:
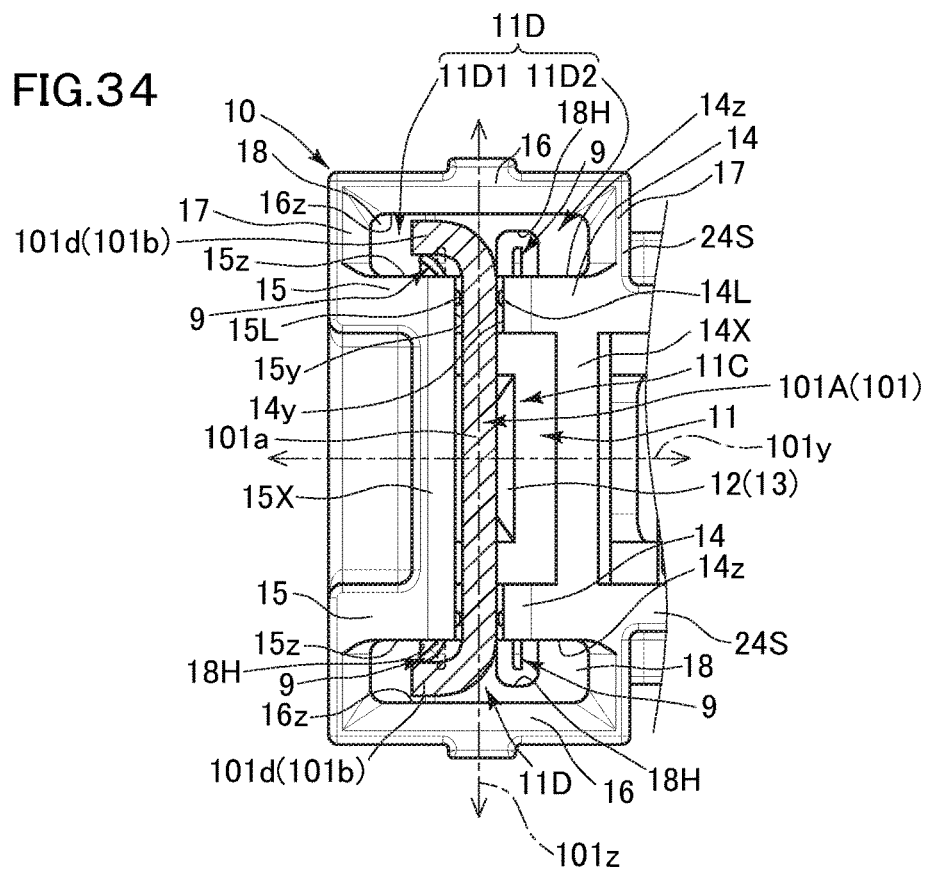
FIG. 34 shows the cross-section, taken along the line XIII-XIII of FIG. 3, of the bottom surface of the vehicle component shown in FIG. 33 having the bracket assembled thereto.

The modification of the third embodiment shown in FIGS. 33 and 34 is substantially similar to the third embodiment shown in FIGS. 31 and 32, but is different from the third embodiment in that the elastic projecting part 9 projects from the side wall surface 14z, 15z. The side wall surface 14z, 15z is an inner wall surface that faces the bent end part 101d of the accommodated bracket 101 on the side of the central part 101a in the widthwise direction 101z. The elastic projecting part 9 projects from each of the side wall surfaces 14z and 15z toward the opposite side to the side of the central part 101a in the widthwise direction 101z. The opening 18H in the bottom wall part 18 is formed on each of the first side and the second side in the plate thickness direction 101y of the accommodated bracket 101 so as to correspond to each elastic projecting part 9.

REFERENCE SIGN LIST 1000, 1001, 1002: Bracket assembling mechanism
1: Vehicle holding component (Vehicle component)
5: Predetermined member
9: Elastic projecting part
10: Assembling part
11: Accommodating part
11H: Lower opening
12: Retainer engaging part
13: Engaging claw
101: Bracket

The invention claimed is:

1. A bracket assembling mechanism that assembles a bracket attached to a vehicle body to an assembling part of a vehicle component, wherein
the assembling part includes an accommodating part that accommodates the bracket from a lower opening toward an upper direction and a retainer engaging part that is engaged with a retainer part of the bracket so as to prevent removal of the bracket in an accommodated state, and
the accommodating part includes a plurality of central wall surfaces that oppose to each other to sandwich the bracket in an accommodated state in a plate thickness direction, a side wall surface that opposes the bracket in an accommodated state in a widthwise direction of the bracket, and an elastic projecting part that projects from the side wall surface and that is pressed, at its distal end side, against an end part of the bracket in the widthwise direction when the bracket is accommodated in the accommodating part so as to be bent and elastically deformed in the plate thickness direction.

2. The bracket assembling mechanism according to claim 1, wherein the elastic projecting part is formed as a projection that extends in a movement direction of the bracket, and a distal end side of the projection is bent to contact the bracket.

3. The bracket assembling mechanism according to claim 2, wherein the accommodating part includes a bottom wall on an inner side in the movement direction, the bottom wall includes an opening near an end part of the elastic projecting part on the inner side in the movement direction, and thus an inner side of the elastic projecting part does not contact other walls of the accommodating part.

4. The bracket assembling mechanism according to claim 1, wherein
the accommodating part includes a central accommodating part that is formed between the central wall surfaces opposing to each other and that accommodates a central part of the bracket in the widthwise direction and an end accommodating part whose inner wall surface is the side wall surface, that accommodates an end part of the bracket in the widthwise direction even when the end part is a bent end part that is bent from the central part in the plate thickness direction, and
the end accommodating part includes a first bent-end accommodating part and a second bent-end accommodating part that respectively extend from both ends of the central accommodating part in the widthwise direction toward a first side in the plate thickness direction and a second side opposite to the first side, the bent end part of the bracket can be accommodated even when the bent end part is bent to the first side or the second side.

5. Then bracket assembling mechanism according to claim 4, wherein the side wall surface and the elastic projection part are provided in the first bent-end accommodating part and the second bent-end accommodating part.

6. The bracket assembling mechanism according to claim 5, wherein
the side wall surface is an inner wall surface that faces the bent end part of the bracket in an accommodated state on a side of the central part in the widthwise direction, and
the elastic projecting part projects from the side wall surface toward an opposite side to the central part in the widthwise direction.

7. The bracket assembling mechanism according to claim 5, wherein
the side wall surface is an inner wall surface that faces the bent end part of the bracket in an accommodated state on an opposite side to the side of the central part in the widthwise direction, and
the elastic projecting part projects from the side wall surface toward the side of the central part in the widthwise direction.

8. The bracket assembling mechanism according to claim 4, wherein
the side wall surface is an inner wall surface that faces the bracket in an accommodated state on the opposite side to the side of the central part in the widthwise direction, and
the elastic projecting part projects from an intermediate part between the first bent-end accommodating part and the second bent-end accommodating part in the side wall surface toward the side of the central part in the widthwise direction.

9. The bracket assembling mechanism according to claim 1, wherein the elastic projecting part projects so as to be inclined from a proximal end side in a manner that a distal end side leans toward the first side or the second side in the plate thickness direction of the bracket in an accommodated state.

10. The bracket assembling mechanism according to claim 9, wherein the side wall surface includes a recess that is recessed so as to include an inner wall surface that is continuous with an inclined lower surface of the elastic projecting part, on a side of a proximal end part of the elastic projecting part toward which the elastic projecting part is inclined.

11. The bracket assembling mechanism according to claim 1, wherein
the elastic projecting part is a projection that extends in a movement direction of the bracket, and
a projecting distal end surface of the elastic projecting part includes, at least on an outer side in the movement direction of the bracket, a deformation inducing surface that induces elastic deformation of the elastic projecting part toward the first side or the second side in the plate thickness direction when the bracket is accommodated.

12. The bracket assembling mechanism according to claim 1, wherein
the elastic projecting part is a projection that extends in a movement direction of the bracket, and
the elastic projecting part is formed on both end sides in the widthwise direction of the bracket in an accommodated state and includes a first projecting part that has such a projection amount as to be capable of receiving the bracket to be accommodated in the accommodating part while keeping a space equal to or larger than a predetermined width between the first projecting part in an elastically undeformed state and an end part of the bracket in the widthwise direction, a second projecting part that is continuous with the first projecting part on the inner side in the movement direction of the bracket and that has such a projection amount as to be capable of receiving the bracket substantially without any space between the second projecting part in an elastically undeformed state and the end part of the bracket in the widthwise direction, and a third projecting part that is continuous with the second projecting part on the inner side in the movement direction and that has such a projection amount as to be pressed against the end part of the bracket in the widthwise direction and elastically deformed to receive the bracket.

13. The bracket assembling mechanism according to claim 12, wherein the retainer engaging part is an elastic engaging part, where the elastic engaging part includes, on an upper side of the elastic engaging part, an engaging claw that projects inwardly into the accommodating part to be pressed from a lower direction by the bracket that is moved upward from a lower opening of the accommodating part, the elastic engaging part is elastically deformed from a lower side of the elastic engaging part by being pressed by the bracket to allow for upward movement of the bracket, and when the bracket is further moved upward and an engaging hole of the bracket is moved to a position of the engaging claw, the elastic engaging part elastically returns to an original shape to cause the engaging claw to enter the engaging hole and thus the engaging claw entering the engaging hole abuts against an inner peripheral upper surface of the engaging hole, thus preventing downward removal of the bracket, and the retainer engaging part is elastically deformed by being pressed by the bracket after the bracket is moved to a position of the second projecting part of the elastic projecting part.

* * * * *